(12) United States Patent
Palmer et al.

(10) Patent No.: US 11,136,112 B2
(45) Date of Patent: Oct. 5, 2021

(54) AIRCRAFT LANDING GEAR FORWARD TRUNNION SUPPORT ASSEMBLIES, TRUNNION HOUSINGS AND RELATED METHODS

(71) Applicant: The Boeing Company, Chicago, IL (US)

(72) Inventors: Ben J. Palmer, Seattle, WA (US); Ryan J. Cazin, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 107 days.

(21) Appl. No.: 16/732,789

(22) Filed: Jan. 2, 2020

(65) Prior Publication Data

US 2021/0206472 A1    Jul. 8, 2021

(51) Int. Cl.
| | |
|---|---|
| *B64C 25/10* | (2006.01) |
| *B64C 3/48* | (2006.01) |
| *B64C 25/04* | (2006.01) |
| *B64C 25/12* | (2006.01) |
| *B64C 3/56* | (2006.01) |

(52) U.S. Cl.
CPC ............... *B64C 25/10* (2013.01); *B64C 3/48* (2013.01); *B64C 25/04* (2013.01); *B64C 25/12* (2013.01); *B64C 3/56* (2013.01)

(58) Field of Classification Search
CPC .. B64C 3/48; B64C 3/56; B64C 25/04; B64C 25/10; B64C 25/12
See application file for complete search history.

(56) References Cited

U.S. PATENT DOCUMENTS

| | | | | |
|---|---|---|---|---|
| 4,392,623 | A  * | 7/1983 | Munsen | B64C 25/10 244/102 R |
| 6,517,307 | B1 * | 2/2003 | Marino | B66F 9/18 187/222 |
| 2013/0048783 | A1 * | 2/2013 | Ekmedzic | B64C 25/04 244/102 R |
| 2017/0106992 | A1 * | 4/2017 | Hemingway | B60K 15/03 |
| 2020/0324882 | A1 * | 10/2020 | Cazin | B64C 3/185 |

FOREIGN PATENT DOCUMENTS

| | | |
|---|---|---|
| EP | 1060986 A1 | 12/2000 |
| EP | 1407963 A2 | 4/2004 |
| EP | 2562083 A2 | 2/2013 |
| FR | 2348851 A1 | 11/1977 |
| WO | WO8202179 A1 | 8/1982 |

* cited by examiner

*Primary Examiner* — Rodney A Bonnette
(74) *Attorney, Agent, or Firm* — Quinn IP Law

(57) ABSTRACT

Aircraft landing gear forward trunnion support assemblies and related methods are described herein. An example aircraft wing disclosed herein includes a rear spar having a rear side and a front side opposite the rear side and a forward trunnion support assembly. The forward trunnion support assembly includes first and second vertical support fittings coupled to the rear side of the rear spar, and a trunnion housing with a bearing. The trunnion housing is coupled between the first and second vertical support fittings. The trunnion housing also includes first and second shoulders formed on a top side of the trunnion housing, each of the first and second shoulders having a respective open trough formed on a respective top surface thereof, thereby defining first and second cradles. A fuse pin is received within the troughs and has first and second ends extending through the first and second vertical support fittings respectively.

20 Claims, 16 Drawing Sheets

AIRCRAFT LANDING GEAR FORWARD TRUNNION SUPPORT ASSEMBLIES, TRUNNION HOUSINGS AND RELATED METHODS

FIELD OF THE DISCLOSURE

This disclosure relates generally to aircraft and, more particularly, to aircraft landing gear forward trunnion support assemblies and trunnion housings and related methods.

BACKGROUND

Aircraft (e.g., commercial aircraft) commonly include landing gear (e.g., left main landing gear, right main landing gear, etc.) that may be actuated to move between a deployed position and a retracted position. For example, the landing gear of an aircraft may be actuated to move from the deployed position to the retracted position subsequent to and/or in connection with a takeoff procedure of the aircraft, and from the retracted position back to the deployed position prior to and/or in connection with a landing procedure of the aircraft. The landing gear is connected to various support structures in the fuselage and/or wings of the aircraft. The landing gear and these support structures are subjected to extremely high loads, especially when landing and braking, for instance.

SUMMARY

An example aircraft wing disclosed herein includes a rear spar having a rear side and a front side opposite the rear side and a forward trunnion support assembly. The forward trunnion support assembly includes a first vertical support fitting and a second vertical support fitting coupled to the rear side of the rear spar, and a trunnion housing with a bearing. The trunnion housing is coupled between the first and second vertical support fittings. The trunnion housing also includes first and second shoulders formed on and protruding upward from a top side of the trunnion housing, with each of the first and second shoulders having a respective open trough formed on a respective top surface thereof, thereby defining first and second cradles. A fuse pin is received within the open troughs and has a first end extending through the first vertical support fitting and a second end extending through the second vertical support fitting.

An example method disclosed herein includes coupling a trunnion housing between a first vertical support fitting and a second vertical support fitting. The trunnion housing includes a bearing and has first and second shoulders formed on and protruding upward from a top side of the trunnion housing, with each of the first and second shoulders having a respective open trough formed on a respective top surface thereof, thereby defining first and second cradles. The example method includes inserting a fuse pin through a first hole in the first vertical support fitting and a second hole in the second vertical support fitting. A first end of the fuse pin extends through the first hole and a second end of the fuse pin extends through the second hole, and the fuse pin is received within the open troughs.

An example trunnion housing for an aircraft wing disclosed herein includes a generally rectangular prism-shaped body portion having opposed top and bottom sides, opposed outboard and inboard sides, and opposed forward and aftward sides. The body portion has an opening through the forward and aftward sides defining a spherical bearing therewithin, with the spherical bearing having a central axis perpendicular to the opposed forward and aftward sides. The trunnion housing includes first and second shoulders formed on and protruding upward from the top side of the body portion. The first and second shoulders are spaced apart such that the first shoulder is disposed adjacent the outboard side and the second shoulder is disposed adjacent the inboard side. Each of the first and second shoulders has a respective arcuately profiled open trough formed on a respective top surface thereof, thereby defining first and second cradles, wherein each of the open troughs has a respective longitudinal axis perpendicular to the central axis of the bearing.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIG. 12A includes a body portion and a single long fuse pin, while FIG. 12B includes the body portion without the single long fuse pin.

Figure 1:
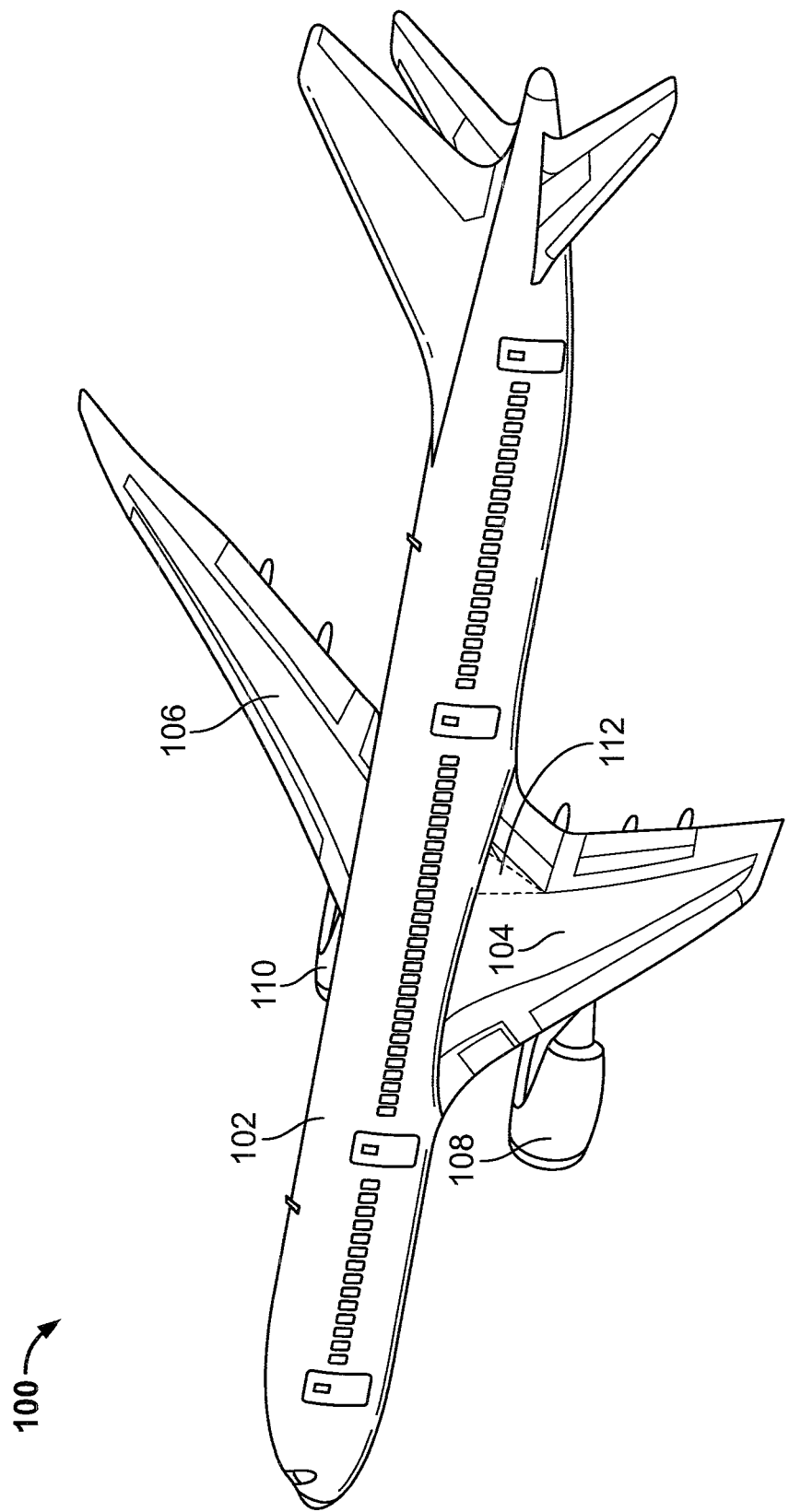
FIG. 1 illustrates an example aircraft in which the examples disclosed herein can be implemented.

The figures are not necessarily to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located there-between. Stating that any part is in contact with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

Note that some of the drawings herein are presented in multiple related views, with the related views sharing a common Arabic numeral portion of the figure number and each individual view having its own unique "alphabetic" portion of the figure number. For example, FIGS. 13A and 13B are perspective views of the example trunnion housing showing the body portion with and without the single long fuse pin, respectively; both related views share the same Arabic numeral (i.e., 13), but each individual view has its own unique "alphabetic" designation (i.e., A or B). When drawings are numbered in this way, reference may be made herein to the Arabic number alone to refer collectively to all the associated "alphabetics"; thus, "FIG. 10" refers to FIGS. 10A through 10C collectively. Likewise, "FIG. 11" refers to FIGS. 11A and 11B collectively, "FIG. 12" refers to FIGS. 12A and 12B collectively, and "FIG. 13" refers to FIGS. 13A and 13B collectively.

DETAILED DESCRIPTION

Disclosed herein are example forward trunnion support assemblies and trunnion housings for aircraft main landing gear. Example forward trunnion support assemblies disclosed herein include a trunnion housing having shoulders which interface with a single elongate fuse pin, as described below. As such, the example forward trunnion support assemblies disclosed herein utilize less hardware than known assemblies, which reduces overall weight to the aircraft and, thus, improves fuel efficiency.

Also disclosed herein are related methods of assembling and/or installing forward trunnion support assemblies. The example forward trunnion support assemblies disclosed herein are easier and quicker to install than known assemblies, which reduces overall assembly time and cost.

Now turning to the figures, FIG. 1 illustrates an example aircraft 100 in which the examples disclosed herein can be implemented. The aircraft 100 includes a fuselage 102, a first wing 104 (a left wing) coupled to and extending outward from the fuselage 102, and a second wing 106 (a right wing) coupled to and extending outward from the fuselage 102. In the illustrated example, the aircraft 100 includes a first engine 108 carried by the first wing 104 and a second engine 110 carried by the second wing 106. In other examples, the aircraft 100 may include only one engine or may include more than two engines, and the engines may be coupled to the first and/or second wings 104, 106 and/or another structure on the aircraft 100 (e.g., on the tail section of the fuselage 102).

The aircraft 100 includes landing gear that is used for taxiing, takeoff, and landing. The landing gear of the aircraft 100 may have many different arrangements. Typical aircraft employ a tricycle undercarriage arrangement including a left main landing gear (LMLG), a right main landing gear (RMLG), and a front wheel near the nose of the fuselage 102. The LMLG is coupled to the bottom of the first wing 104 at or near the root of the first wing 104 where the first wing 104 is coupled to the fuselage 102. Similarly, the RMLG is coupled to the bottom of the second wing 106 at or near the root of the second wing 106 where the second wing 106 is coupled to the fuselage 102. The front wheel is coupled to the bottom of the fuselage 102 near the nose. The LMLG, RMLG and front wheel are movable between a deployed state and a retracted state.

The LMLG is coupled the first wing 104 and the fuselage 102 via one or more structures (e.g., spars, beams, etc.) forming a gear triangle 112. An example location of the gear triangle 112 is illustrated in FIG. 1. In some examples, the gear triangle 112 is formed by a rear spar, a gear beam, and a side of the fuselage, as disclosed in further detail herein. The RMLG is similarly coupled to the second wing 106 and the fuselage 102 via another gear triangle. The examples disclosed herein are described in connection with the LMLG. However, it is understood that any of the examples disclosed herein in connection with the LMLG can likewise apply to the RMLG.

Figure 2:
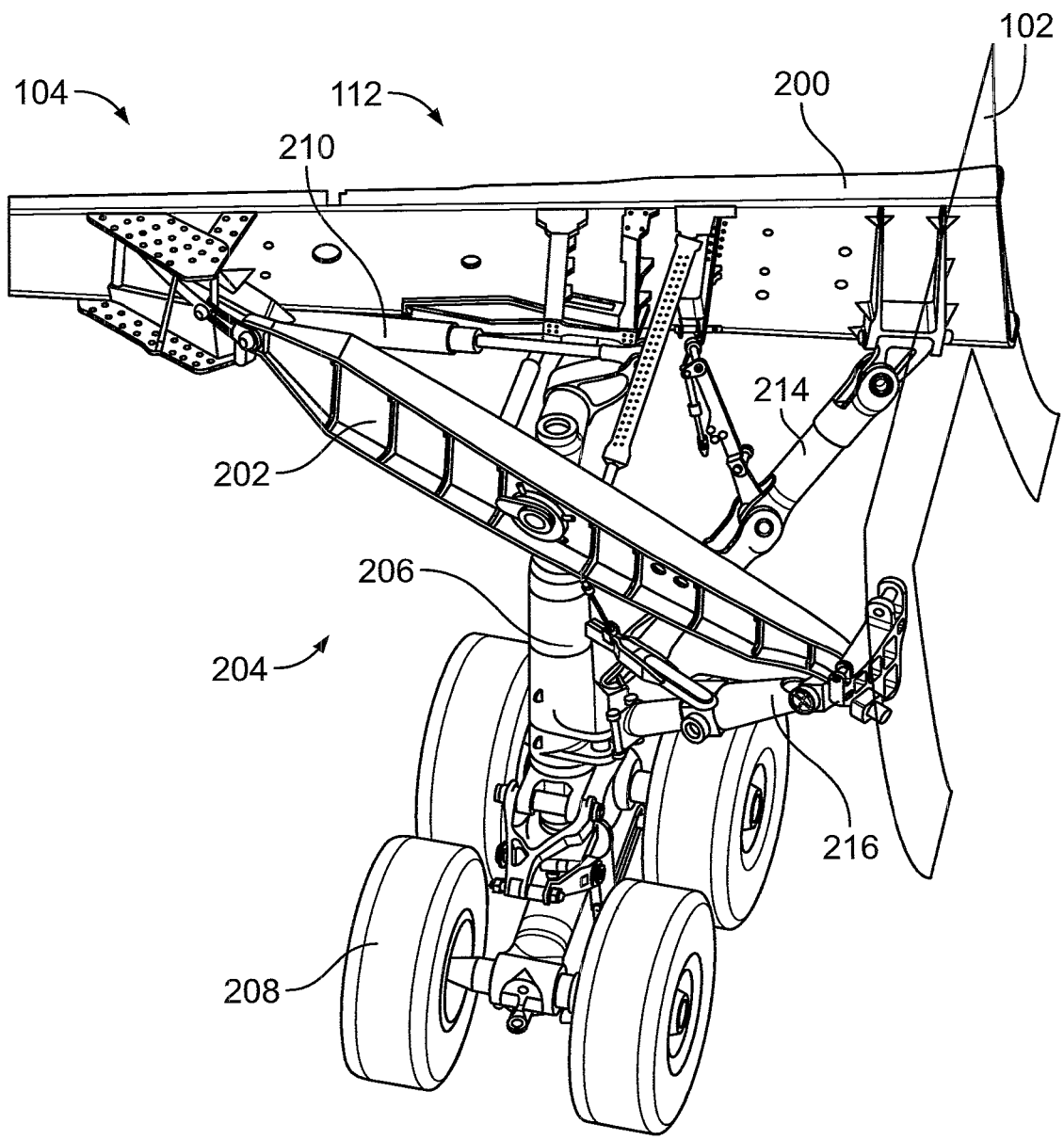
FIG. 2 illustrates a left main landing gear employed on an example wing of the aircraft of FIG. 1.

FIG. 2 shows the gear triangle 112 of the first wing 104. In FIG. 2, the top and bottom skin (e.g., panels) and the control surfaces of the first wing 104 have been removed to expose the internal structures of the first wing 104 that form the gear triangle 112. The first wing 104 includes a rear spar 200. The rear spar 200 is one of the primary load bearing members in the first wing 104. The rear spar 200 extends outward from the fuselage 102 to a tip of the first wing 104. In this example, the rear spar 200 has a C- or U-shaped cross-section or profile. In some examples, the rear spar 200 is constructed of a composite material, such as carbon fiber. The first wing 104 also has a front spar that extends outward from fuselage 102 and extends along the front (fore) side of the first wing 104. A plurality of ribs are coupled between the rear spar 200 and the front spar. In the illustrated example, the first wing 104 also includes a gear beam 202. The gear beam 202 is coupled between the rear spar 200 and the fuselage 102.

As can be seen from FIG. 2, the gear triangle 112 is formed by three main structures including (1) the gear beam 202, (2) the portion of the rear spar 200 between the fuselage 102 and the gear beam 202, and (3) the portion of the fuselage 102 between the rear spar 200 and the gear beam 202. Also shown in FIG. 2 is an example LMLG 204 (sometimes referred to as a landing gear assembly). The LMLG 204 is coupled to the gear triangle 112. The LMLG 204 is movable between a deployed state (as shown in FIG. 2) and a retracted or stowed state. The LMLG 204 includes a shock strut 206 (sometimes referred to as a post, an outer cylinder, and/or an oleo) and one or more wheels 208 coupled to the shock strut 206. In the illustrated example, the LMLG 204 includes four wheels 208 (one of which is referenced in FIG. 2). However, in other examples, the LMLG 204 can include more or fewer wheels (e.g., one wheel, two wheels, three wheels, five wheels, etc.). The LMLG 204 includes an actuator 210 to rotate the shock strut 206 between the deployed and retracted positions.

The LMLG 204 of FIG. 2 also includes a drag brace 214 (a first brace) and a side brace 216 (a second brace) that are used to transfer horizontal loads away from the shock strut 206. The drag brace 214 is coupled between the shock strut 206 and the rear spar 200 (near the fuselage 102). The side brace 216 is coupled between the shock strut 206 and the gear beam 202 (near the fuselage 102). The drag brace 214 and the side brace 216 can each include two or more links (struts) that enable the drag brace 214 and the side brace 216, respectively, to fold when the LMLG 204 is retracted.

Figure 3:
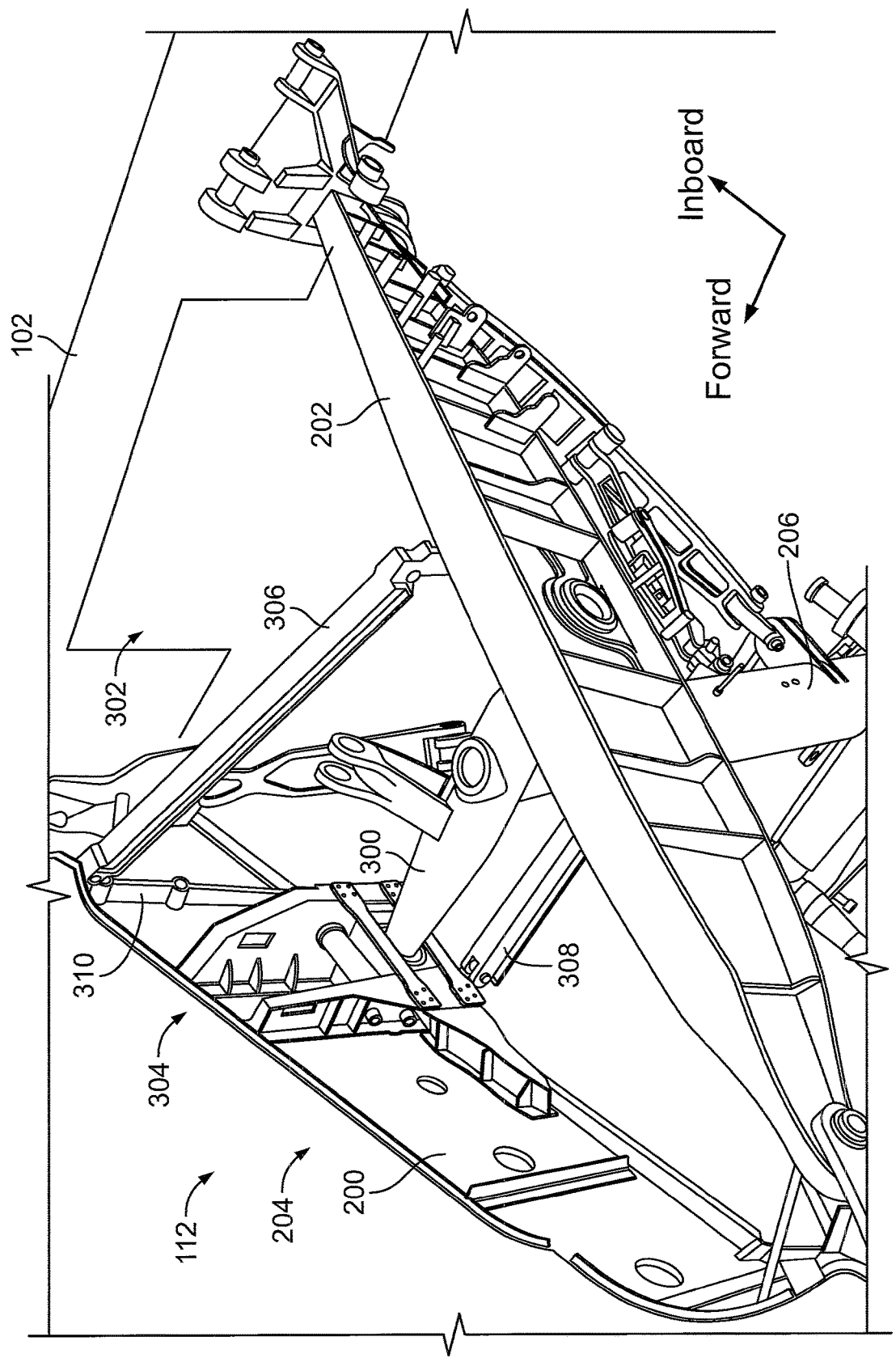
FIG. 3 shows a known forward trunnion support assembly used in connection with the left main landing gear of FIG. 2.

FIG. 3 is another perspective view of the LMLG 204 in the deployed state. In FIG. 3, the actuator 210 (FIG. 2) has been removed for clarity. The shock strut 206 is pivotably coupled to the rear spar 200 and the gear beam 202 via a trunnion 300. In the deployed state, as shown in FIG. 3, the shock strut 206 is oriented substantially vertically such that the wheels 208 (FIG. 2) are located beneath the aircraft 100 (FIG. 1). To retract the LMLG 204 (e.g., after takeoff), the shock strut 206 is rotated (via the trunnion 300) upward toward the fuselage 102, which moves the wheels 208 into a well 302 formed in the bottom of the fuselage 102. To deploy the LMLG 204 (e.g., prior to landing), the shock strut 206 is rotated (via the trunnion 300) downward to the vertical orientation shown in FIG. 3.

The trunnion 300 extends between the rear spar 200 and the gear beam 202. In FIG. 3, the trunnion 300 is rotatably coupled to the rear spar 200 via a forward trunnion support assembly 304 on the rear spar 200. The forward trunnion support assembly 304 shown in FIG. 3 is a known forward trunnion support assembly. The opposite end of the trunnion 300 is similarly rotatably coupled to the gear beam 202 via a rear trunnion support assembly on the gear beam 202. The forward trunnion support assembly 304 and the rear trunnion support assembly enable the trunnion 300 (and, thus, the shock strut 206) to pivot/rotate about an axis.

Due to industry safety requirements, the LMLG 204 is required to be able to be severed from the gear triangle 112 without rupturing the fuel tank (which is stored inside of the first wing 104) and without removing the gear beam 202 from the first wing 104. As such, many constraints dictate the design and function of the forward trunnion support assembly 304. Parts of the forward trunnion support assembly 304 are configured to break when a sufficient vertical or aft load with or without a side load component is exerted, which enables the shock strut 206 (as well as other parts of the LMLG 204) to sever from the gear triangle 112.

To provide support and rigidity to the gear beam 202, the first wing 104 includes an upper stabilization brace 306 and a lower stabilization brace 308. The upper and lower stabilization braces 306, 308 are coupled to and extend between the rear spar 200 and the gear beam 202. The upper stabilization brace 306 is located at or near a top of the rear spar 200, whereas the lower stabilization brace 308 is located at or near a bottom of the rear spar 200. As shown in FIG. 3, the upper stabilization brace 306 is located inboard relative to the trunnion 300, and the lower stabilization brace 308 is located outboard relative to the trunnion 300. One end of the upper stabilization brace 306 is coupled to an upper stabilization brace fitting 310 disposed on the rear spar 200. The opposite end of the upper stabilization brace 306 is coupled to another fitting on the gear beam 202. The ends of the lower stabilization brace 308 are similarly coupled to fittings on the rear spar 200 and the gear beam 202.

Figure 4:
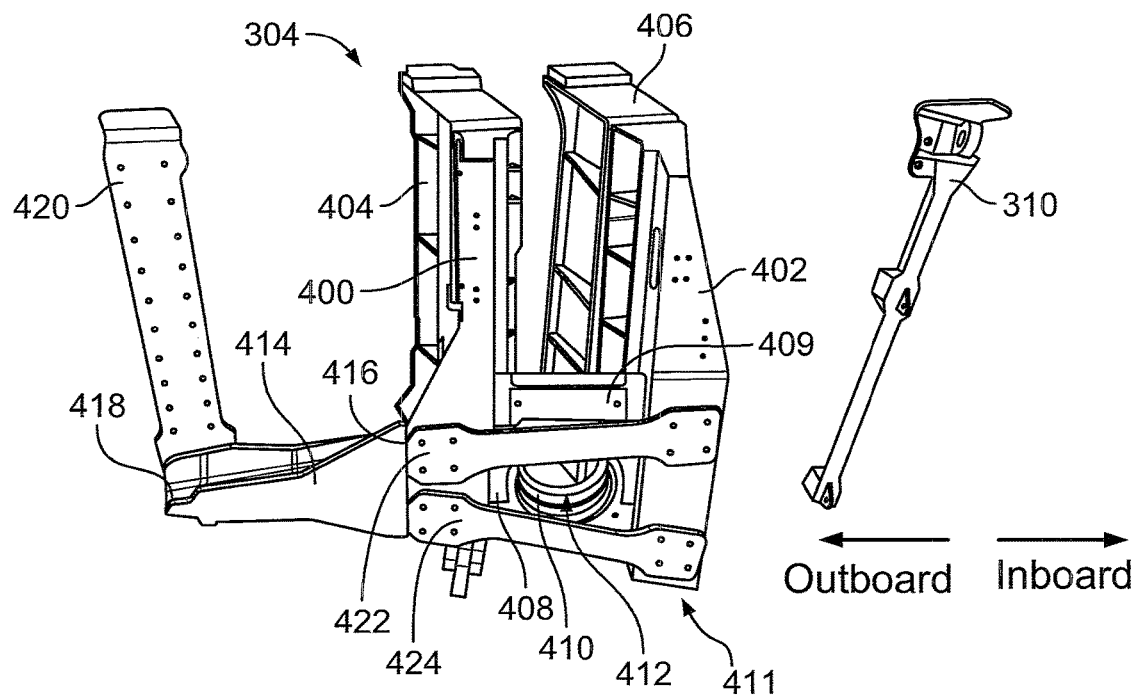
FIG. 4 is an isolated perspective view of the known forward trunnion support assembly of FIG. 3 and a known upper stabilization brace fitting.
Figure 5:
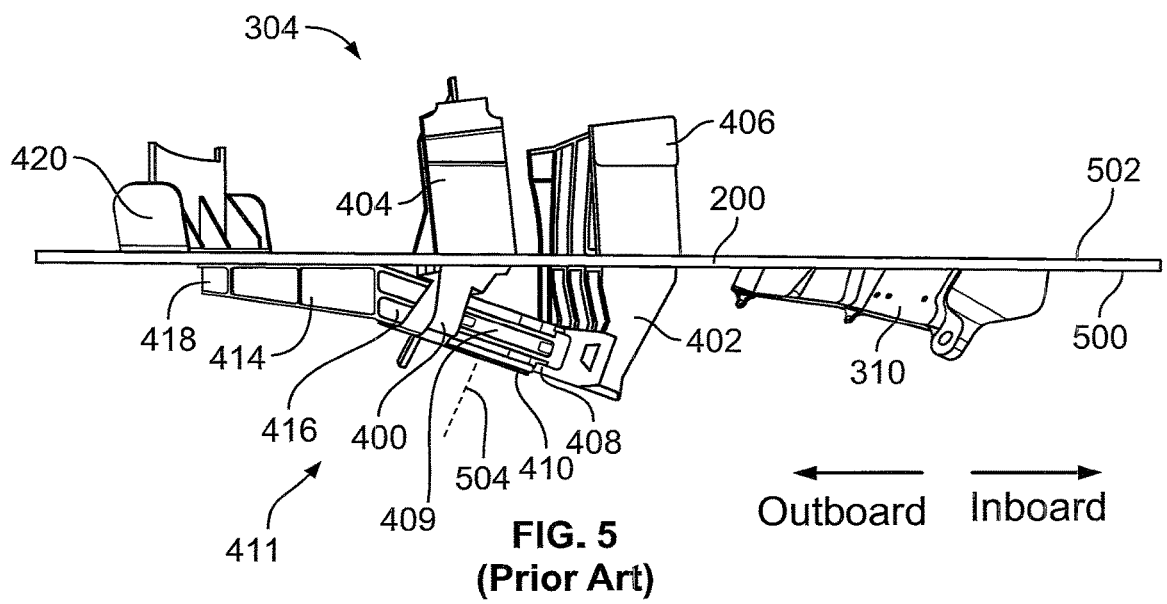
FIG. 5 shows the known forward trunnion support assembly and upper stabilization brace fitting of FIG. 4 on a rear spar.

FIG. 4 is a perspective view of the known forward trunnion support assembly 304 and the upper stabilization brace fitting 310. The rear spar 200 is not shown in FIG. 4. FIG. 5 is a top cross-sectional view of the rear spar 200 looking downward on the known forward trunnion support assembly 304 and the upper stabilization brace fitting 310. The rear spar 200 has a rear side 500 (an aft side, an outer side, an outside face) and a front side 502 (a forward side, an inner side, an inside face) opposite the rear side 500. As shown in FIGS. 4 and 5, the known forward trunnion support assembly 304 includes a first vertical support fitting 400 and a second vertical support fitting 402. The first and second vertical support fittings 400, 402 are disposed on and coupled to the rear side 500 of the rear spar 200. The first and second vertical support fittings 400, 402 are coupled (via fasteners) to respective first and second vertical backup fittings 404, 406 that are disposed on the front side 502 of the rear spar 200. The known forward trunnion support assembly 304 includes a lower trunnion housing 408 with a bearing 410, as well as an upper housing 409. The lower trunnion housing 408 and upper housing 409 define a known trunnion housing sub-assembly 411 and are coupled between the first and second vertical support fittings 400, 402, with upper housing 409 disposed above the lower trunnion housing 408. The bearing 410 forms an opening 412 that receives the trunnion 300 (FIG. 3).

As shown in FIG. 5, the lower trunnion housing 408 (and, thus, the bearing 410) are angled with respect to the rear spar 200. In particular, a central axis 504 of the lower trunnion housing 408 and the bearing 410 is not perpendicular to the rear side 500 of rear spar 200. Thus, a normal of the rear spar 200 (a line extending perpendicular to the rear spar 200) and a normal of the lower trunnion housing 408 (a line extending perpendicular to the lower trunnion housing 408) are not parallel. Instead, the lower trunnion housing 408 and the bearing 410 are angled in the outboard direction. Note that the upper housing 409 may likewise be angled in the outboard direction.

The lower trunnion housing 408 and the bearing 410 may experience significant side-to-side loads (horizontal loads) from the trunnion 300 (FIG. 3). For instance, if a pilot desires to steer the aircraft 100 (FIG. 1) to the left while the aircraft 100 is on the ground, the pilot may lock the LMLG 204 (e.g., apply a brake to the wheels 208) and increase thrust to the right engine(s). This causes the aircraft 100 to pivot about the LMLG 204, thereby steering the aircraft 100 to the left. This pivoting action also induces side-to-side (horizontal) loads in the trunnion 300 and the lower trunnion housing 408.

To help distribute some of these side-to-side loads, the known forward trunnion support assembly 304 includes a side load fitting 414 coupled between the first vertical support fitting 400 and the rear spar 200. Because the lower trunnion housing 408 is angled toward the outboard direction, the side load fitting 414 is located outboard of the lower trunnion housing 408, which creates a more direct load path from the lower trunnion housing 408 to the rear spar 200. A first end 416 of the side load fitting 414 is coupled to the first vertical support fitting 400 and a second end 418 of the side load fitting 414 is coupled to the rear spar 200, outboard of the first vertical support fitting 400. The known forward trunnion support assembly 304 includes a side load backup fitting 420 that is disposed on the front side 502 of the rear spar 200. The second end 418 of the side load fitting 414 is coupled (via fasteners), through the rear spar 200, to the side load backup fitting 420. The side load backup fitting 420 is a vertical member that extends vertically on the front side 502 of the rear spar 200. The side load backup fitting 420 distributes the loads provided by the side load fitting 414 along the height of the rear spar 200. The known forward trunnion support assembly 304 also includes first and second straps 422, 424 coupled between the first and second vertical support fittings 400, 402. If the trunnion 300 (FIG. 3) is pushed in the outboard direction, for instance, the side load fitting 414 is placed in compression and transfers the loads to the side load backup fitting 420 and, thus, to the rear spar 200. If the trunnion 300 is pushed in the inboard direction, for instance, the first and second straps 422, 424 transfer the load from the second vertical support fitting 402 to the first vertical support fitting 400, which places the side load fitting 414 in tension. This tensile load is transferred to the side load backup fitting 420, which distributes the load along the rear spar 200.

Also shown in FIGS. 4 and 5 is the known upper stabilization brace fitting 310. The known upper stabilization brace fitting 310 is disposed on the rear side 500 of the rear spar 200. The known upper stabilization brace fitting 310 is a full-height fitting that extends vertically on the rear side 500 of the rear spar 200. The upper stabilization brace 306 (FIG. 3) is to be attached to the upper stabilization brace fitting 310. The upper stabilization brace fitting 310 distributes any loads imparted on the upper stabilization brace fitting 310 by the upper stabilization brace 306 throughout the height of the rear spar 200. The upper stabilization brace fitting 310 is disposed inboard of the first and second vertical support fittings 400, 402 and the lower trunnion housing 408.

Figure 6:
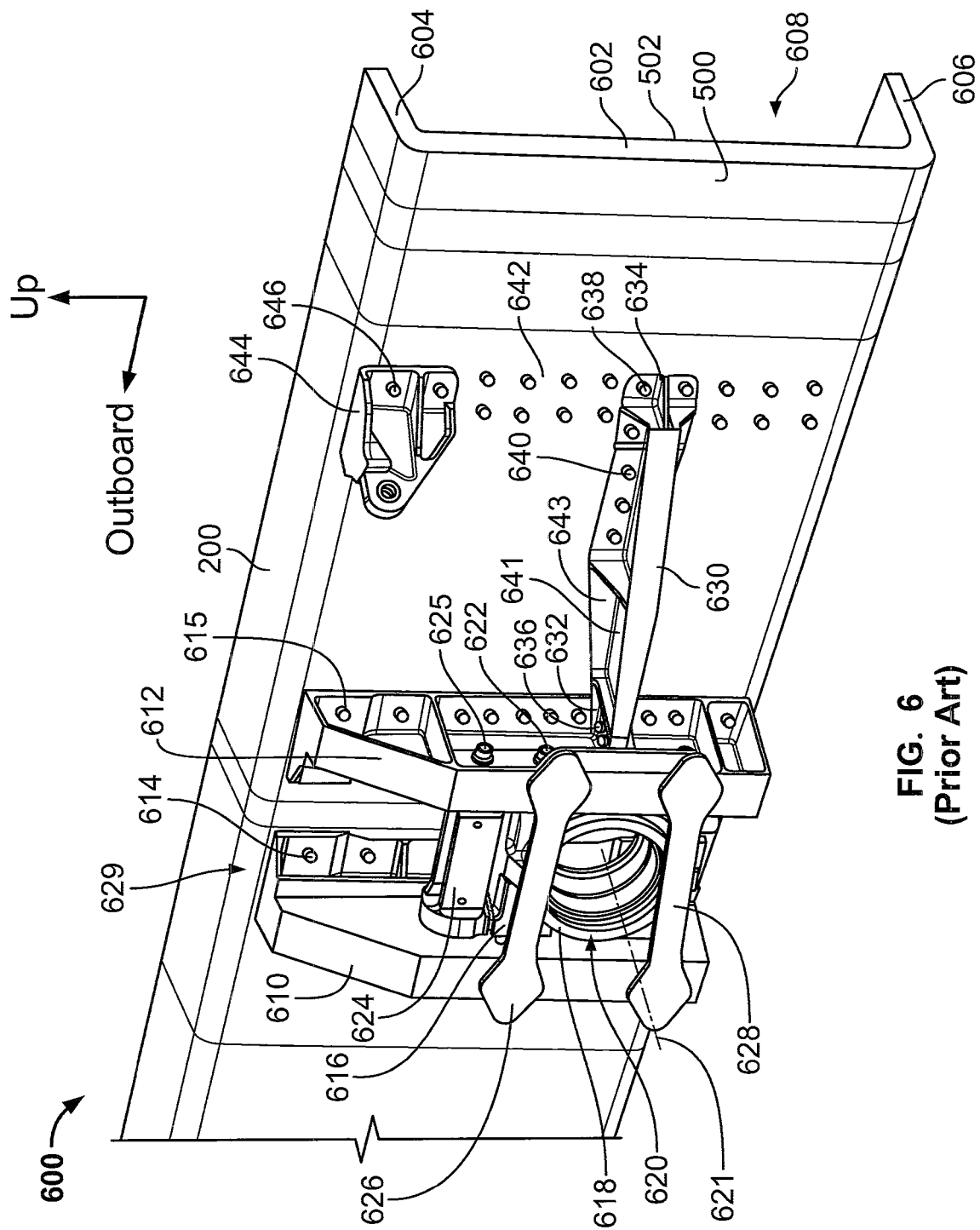
FIG. 6 is a perspective view of a known forward trunnion support assembly and upper stabilization brace fitting on the rear spar of the wing of the aircraft of FIG. 1.

FIG. 6 is a perspective view of another known forward trunnion support assembly 600 shown as coupled to the rear spar 200 of the first wing 104 (FIG. 1). As mentioned above, the rear spar 200 has a C- or U-shaped cross-section or profile. The rear spar 200 has been cross-sectioned in FIG. 6 to illustrate the C- or U-shaped profile. The rear spar 200 includes a web 602, an upper cap 604, and a lower cap 606. The upper and lower caps 604, 606 are sometimes referred as upper and lower flanges. The upper and lower caps 604, 606 extend forward from the web 602 and define a cavity 608 facing the forward direction.

The known forward trunnion support assembly 600 includes a first vertical support fitting 610 (an outboard vertical support fitting) and a second vertical support fitting 612 (an inboard vertical support fitting). The first and second vertical support fittings 610, 612 are parallel to and spaced apart from each other. The first and second vertical support fittings 610, 612 are disposed on the rear side 500 of the rear spar 200. The first and second vertical support fittings 610, 612 are coupled to the rear spar 200 via vertical backup fittings disposed on the front side 502 of the rear spar 200, as shown in further detail in connection with FIG. 8. The first vertical support fitting 610 is coupled to a first vertical backup fitting via a plurality of fasteners 614 (e.g., bolts, screws, etc.) (one of which is referenced in FIG. 6) that extend through the rear spar 200, and the second vertical support fitting 612 is coupled to a second vertical backup fitting via a plurality of fasteners 615 (e.g., bolts, screws, etc.) (one of which is referenced in FIG. 6). Any number of the fasteners 614, 615 may be used (e.g., one fastener, two fasteners, three fasteners, etc.). In this example, the first and second vertical support fittings 610, 612 are in contact with the rear side 500 of the rear spar 200. In other examples, one or more intermediate structures (e.g., a gasket, a seal, a spacer, a bearing pad/plate, etc.) may be disposed between the first and/or second vertical support fittings 610, 612 and the rear spar 200.

The known forward trunnion support assembly 600 of FIG. 6 includes a lower trunnion housing 616 with a bearing 618. In this example, the bearing 618 is a spherical bearing. In other examples, other types of bearings may be implemented. The lower trunnion housing 616 is disposed between and coupled to the first and second vertical support fittings 610, 612. The bearing 618 forms an opening 620 that receives the trunnion 300 (FIG. 3). The bearing 618 enables the trunnion 300 to rotate/pivot. In this example, the lower trunnion housing 616 is oriented such that a central axis 621 of the lower trunnion housing 616 and the bearing 618 is perpendicular to the rear spar 200.

Figure 7:
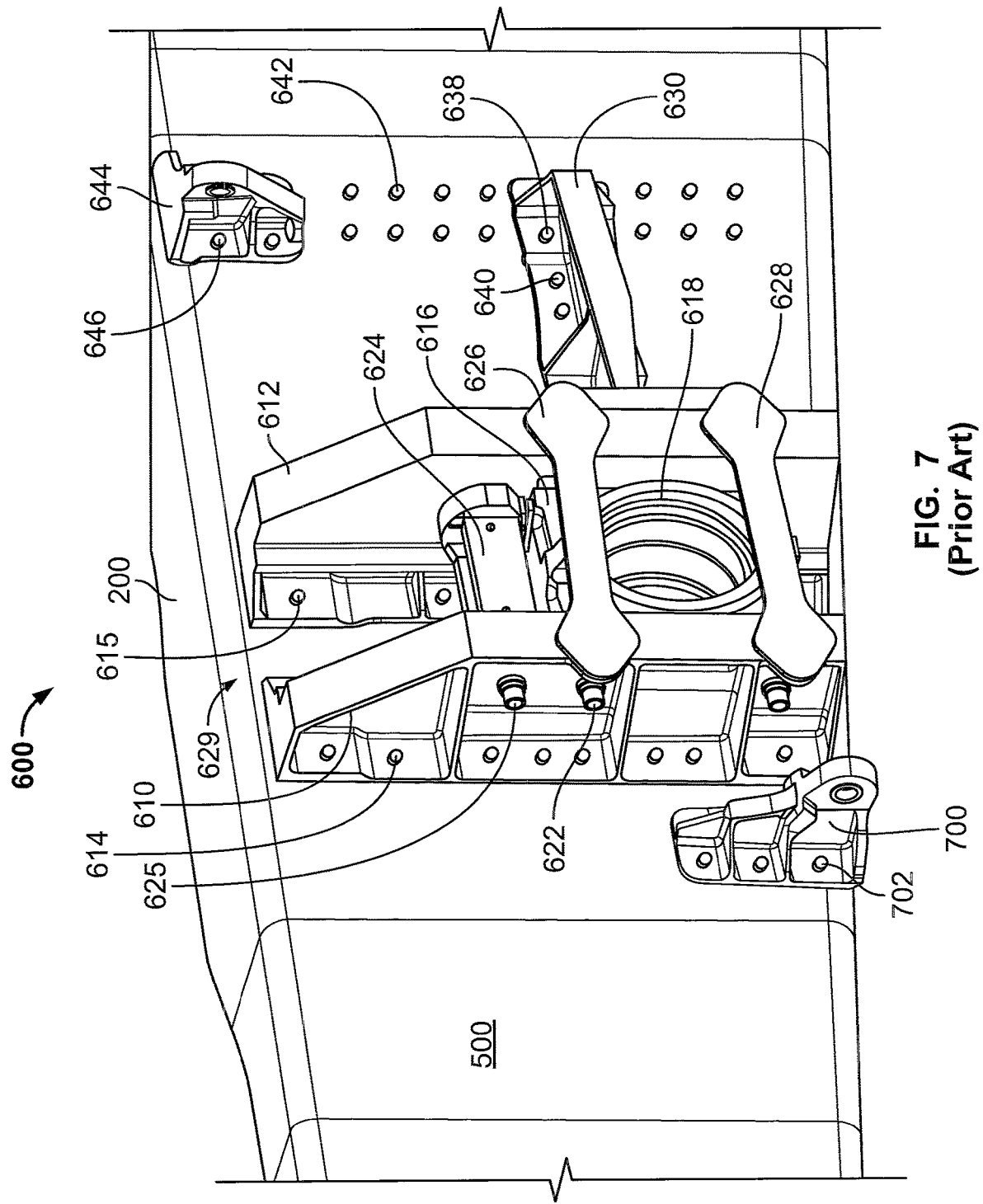
FIG. 7 is another perspective view of the known forward trunnion support assembly and upper stabilization brace fitting of FIG. 6 on the rear spar.

In the known forward trunnion support assembly 600, the lower trunnion housing 616 is coupled to the first and second vertical support fittings 610, 612 via a plurality of fuse pins 622. One of the fuse pins 622 is shown in FIG. 6. Two other fuse pins 622 are shown in FIG. 7. Any number of the fuse pins 622 may be used (e.g., one fuse pin, two fuse pins, three fuse pins, etc.). The fuse pins 622 are designed to break (shear) under a predetermined load, which enables the LMLG 204 to sever from the first wing 104 upon significant vertical loading. In other examples, other types of fasteners may be utilized.

The known forward trunnion support assembly 600 includes an upper housing 624 disposed between and coupled to the first and second vertical support fittings 610, 612. The upper housing 624 is located above the lower trunnion housing 616. In this example, the upper housing 624 is coupled to the first and second vertical support fittings 610, 612 via a plurality of fuse pins 625. One of the fuse pins 625 is shown in FIG. 6, and another fuse pin 625 is shown in FIG. 7. Any number of the fuse pins 625 may be used (e.g., one fuse pin, two fuse pins, three fuse pins, etc.). The upper housing 624 provides additional resistance in the vertical direction should the lower trunnion housing 616 be forced vertically upward.

The known forward trunnion support assembly 600 includes a first strap 626 (an upper strap) and a second strap 628 (a lower strap) coupled between the first and second vertical support fittings 610, 612. The first and second straps 626, 628 transfer side-to-side loads between the first and second vertical support fittings 610, 612.

The first and second vertical support fittings 610, 612, the lower trunnion housing 616, the upper housing 624, and the first and second straps 626, 628 form a forward trunnion housing assembly 629. In some examples, the forward trunnion housing assembly 629 is assembled first, and then the forward trunnion housing assembly 629 is coupled to the rear spar 200 (e.g., via the fasteners 614, 615). In other examples, one or more of the parts of the forward trunnion housing assembly 629 may be assembled in a different order.

For example, the lower trunnion housing 616 may be coupled with the landing gear trunnion 300, and the first and second vertical support fittings 610, 612 may be coupled to the read side 500 of the rear spar 200. Then, the landing gear 204 may be hoisted to the wing 104 and the lower trunnion housing 616 may be aligned between the first and second vertical support fittings 610, 612. Once they are properly aligned, fuse pins 622 may be installed, securing the lower trunnion housing 616 to the first and second vertical support fittings 610, 612. The upper housing 624 may also be aligned between the first and second vertical support fittings 610, 612, and fuse pins 625 may be installed to secure the upper housing 624 in place.

To distribute side loads (inboard/outboard loads) away from the lower trunnion housing 616, the known forward trunnion support assembly 600 includes a side load fitting 630. In this example, the side load fitting 630 is located inboard relative to the forward trunnion housing assembly 629 (i.e., inboard of the first and second vertical support fittings 610, 612 and the lower trunnion housing 616). The side load fitting 630 has a first end 632 and a second end 634 opposite the first end 632. The first end 632 is coupled to the forward trunnion housing assembly 629 and the second end 634 is coupled to the rear spar 200. In this example, the first end 632 of the side load fitting 630 is coupled to the second vertical support fitting 612 (the inboard vertical support fitting). In some examples, the first end 632 of the side load fitting 630 is coupled to the second vertical support fitting 612 via a plurality of fasteners 636 (e.g., bolts, screws, etc.) (one of which is referenced in FIG. 6). The second end 634 of the side load fitting 630 is coupled to a side load backup fitting (shown in FIG. 8) via a plurality of fasteners 638 (e.g., bolts, screws, etc.) (one of which is referenced in FIG. 6). The fasteners 638 extend through the rear spar 200. Also, in this example, the side load fitting 630 is coupled directly to the rear spar 200 via a plurality of fasteners 640 (e.g., bolts, screws, etc.) (one of which is referenced in FIG. 6). Any number of the fasteners 636, 638, 640 may be used (e.g., one fastener, two fasteners, three fasteners, etc.). In this example, the side load fitting 630 is in contact with the rear side 500 of the rear spar 200. In other examples, one or more intermediate structures (e.g., a gasket, a seal, a spacer, a bearing pad/plate, etc.) may be disposed between the side load fitting 630 and the rear spar 200.

In the known forward trunnion support assembly 600, the side load fitting 630 has a first web 641 and a second web 643 (sometimes referred to as first and second flanges). In some examples, the second web 643 is perpendicular to the first web 641. In the illustrated example, the second web 643 is in contact with and coupled to the rear spar 200 via the fasteners 638, 640. The first web 641 is in contact with and coupled to the second vertical support fitting 612.

If the trunnion 300 (FIG. 3) is pushed in the inboard direction, for instance, the side load fitting 630 is placed in compression and transfers the loads to the side load backup fitting and, thus, to the rear spar 200. If the trunnion 300 is pushed in the outboard direction, for instance, the first and second straps 626, 628 transfer the load from the first vertical support fitting 610 to the second vertical support fitting 612, which places the side load fitting 630 in tension. This tensile load is transferred to the side load backup fitting, which distributes the load along the rear spar 200. Thus, the side load fitting 630 is positioned to distribute side-to-side loads from the trunnion 300 (FIG. 3) and the lower trunnion housing 616 to the rear spar 200.

In the illustrated example of FIG. 6, the side load fitting 630 is located closer to a center of the rear spar 200 than a top or bottom of the rear spar 200. This central area (sometimes referred to as a neutral axis) is subjected to less bending stresses than the top and bottom areas of the rear spar 200. Thus, less loads are imparted on the fasteners 636, 638, 640. As such, in some examples, smaller ones of the fasteners 636, 638, 640 can be implemented. Smaller fasteners are often lighter and less expensive. Further, the side load fitting 630 can accommodate larger side loads than known side load fittings because the fasteners 638, 640 do not need to allow for stresses from the bending of the rear spar 200. Thus, the load bearing capacity of the known forward trunnion support assembly 600 is higher than other known assemblies.

The side load backup fitting (shown in FIG. 8) is coupled directly to the rear spar 200 via a plurality of fasteners 642 (e.g., bolts, screws, etc.) (one of which is referenced in FIG. 6). Any number of the fasteners 642 may be used (e.g., one fastener, two fasteners, three fasteners, etc.).

Also shown in FIG. 6 is a known upper stabilization brace fitting 644. The upper stabilization brace fitting 644 is disposed on the rear side 500 of the rear spar 200. The upper stabilization brace 306 (FIG. 3) is to be coupled to the upper stabilization brace fitting 644. The upper stabilization brace fitting 644 is coupled to the side load backup fitting (shown in FIG. 8) via a plurality of fasteners 646 (e.g., bolts, screws, etc.) (one of which is referenced in FIG. 6) extending through the rear spar 200. Any number of the fasteners 646 may be used (e.g., one fastener, two fasteners, three fasteners, etc.). The upper stabilization brace fitting 644 is disposed near a top of the rear spar 200. As shown in FIG. 6, the upper stabilization brace fitting 644 is a non-full-height stabilization brace fitting. In other words, the upper stabilization brace fitting 644 does not extend along a majority of the height of the rear spar 200 as compared to the known upper stabilization brace fitting 310 in FIGS. 3-5. As such, the upper stabilization brace fitting 644 is smaller and lighter, which reduces overall weight to the aircraft 100 (FIG. 1).

FIG. 7 is another perspective view of the rear side 500 of the rear spar 200 showing the known forward trunnion support assembly 600 and the upper stabilization brace fitting 644. The first and second vertical support fittings 610, 612, the lower trunnion housing 616, the bearing 618, the upper housing 624, the first and second straps 626, 628, the forward trunnion housing assembly 629, the side load fitting 630, and the upper stabilization brace fitting 644 are referenced in FIG. 7. Also, one of each of the fasteners 614, 615, 638, 640, 646 and the fuse pins 622, 625 are referenced in FIG. 7.

Also shown in FIG. 7 is a known lower stabilization brace fitting 700. The lower stabilization brace fitting 700 is coupled to the rear side 500 of the rear spar 200. The lower stabilization brace fitting 700 is coupled to the rear spar 200 via a plurality of fasteners 702 (e.g., bolts, screws, etc.) (one of which is referenced in FIG. 7). Any number of the fasteners 702 may be used (e.g., one fastener, two fasteners, three fasteners, etc.). One end of the lower stabilization brace 308 (FIG. 3) is to be coupled to the lower stabilization brace fitting 700. In this example, the lower stabilization brace fitting 700 is separate from the first and second vertical support fittings 610, 612. However, in other examples, the lower stabilization brace fitting 700 may be coupled to or integrated into the first vertical support fitting 610.

Figure 8:
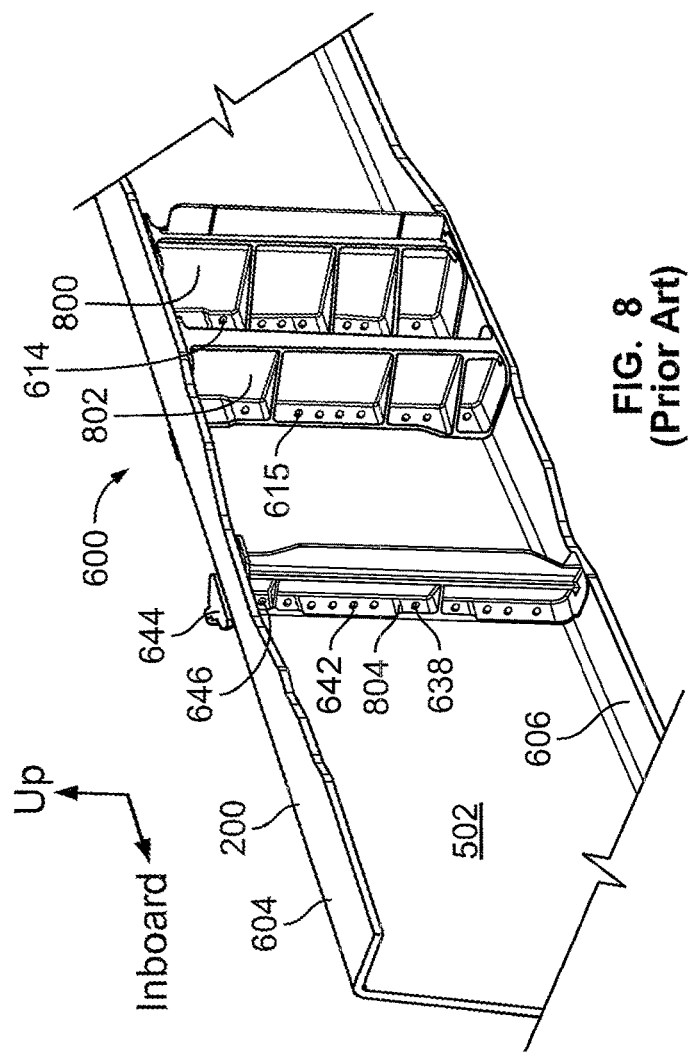
FIG. 8 is a perspective view of a front side of the rear spar of FIG. 6 showing known backup fittings used in connection with the known forward trunnion support assembly and upper stabilization brace fitting.

FIG. 8 is a perspective view of the front side 502 of the rear spar 200. As shown in FIG. 8, the known forward trunnion support assembly 600 includes first and second vertical backup fittings 800, 802. The first vertical support fitting 610 (FIGS. 6 and 7) is coupled to the first vertical backup fitting 800 via the fasteners 614 (one of which is referenced in FIG. 8). The second vertical support fitting 612 (FIGS. 6 and 7) is coupled to the second vertical backup fitting 802 via the fasteners 615 (one of which is referenced in FIG. 8). As shown in FIG. 8, the first and second vertical backup fittings 800, 802 are full-height fittings that extend vertically between the upper and lower caps 604, 606 of the rear spar 200.

As shown in FIG. 8, the known forward trunnion support assembly 600 includes a side load backup fitting 804. The side load backup fitting 804 is disposed on the front side 502 of the rear spar 200. The side load backup fitting 804 is located inboard of the first and second vertical backup fittings 800, 802. The side load backup fitting 804 is a full height fitting that extends vertically between the upper and lower caps 604, 606 on the front side 502 of the rear spar 200. In this example, the side load backup fitting 804 is in contact with the front side 502 of the rear spar 200. In other examples, one or more intermediate structures (e.g., a gasket, a seal, a spacer, a bearing pad/plate, etc.) may be disposed between the side load backup fitting 804 and the rear spar 200.

As shown in FIG. 8, the side load backup fitting 804 is coupled to the rear spar 200 via the fasteners 642 (one of which is referenced in FIG. 8). As disclosed above, the side load fitting 630 (FIG. 6) is coupled to the side load backup fitting 804 via the fasteners 638 (one of which is referenced in FIG. 8), which extend through the rear spar 200. The side load fitting 630 is coupled to the side load backup fitting 804 closer to the center of the rear spar 200 than the top or bottom of the rear spar 200. The side load backup fitting 804 transfers loads to the in-plane direction along the height of the rear spar 200. Additionally, the upper stabilization brace fitting 644 is coupled to the side load backup fitting 804 via the fasteners 646 (one of which is referenced in FIG. 8), which extend through the rear spar 200. Thus, the side load backup fitting 804 provides support for both the side load fitting 630 (FIG. 6) and the upper stabilization brace fitting 644. As such, the known forward trunnion support assembly 600 results in fewer fittings required to support the various components, as in the known assembly 304 in FIGS. 3-5, which has a separate/additional backup fitting for each part. By utilizing fewer parts, the known forward trunnion support assembly 600 is lighter than known assemblies, which improves fuel efficiency for the aircraft 100 (FIG. 1).

Figure 9:
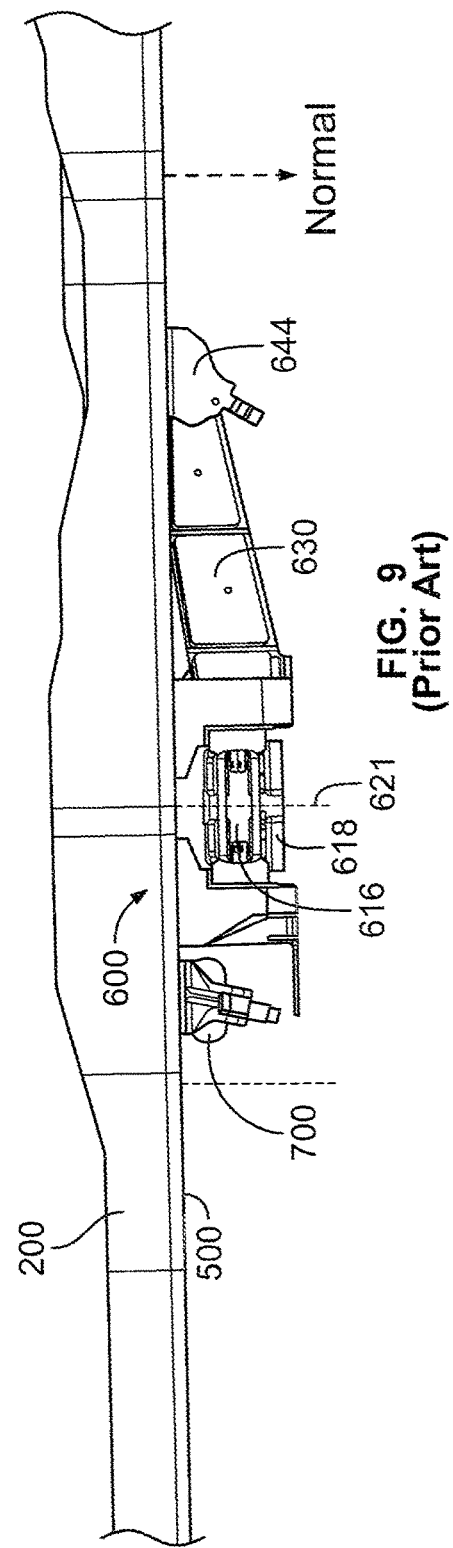
FIG. 9 is a top view of the rear spar of FIG. 6 showing the known forward trunnion support assembly and upper stabilization brace fitting.

FIG. 9 is a top view of the rear spar 200 showing the known forward trunnion support assembly 600 and the upper and lower stabilization brace fittings 644, 700. As shown in FIG. 9, the lower trunnion housing 616 is orientated parallel to the rear side 500 of rear spar 200. In particular, the central axis 621 of the lower trunnion housing 616 and the bearing 618 is perpendicular to the rear side 500 of the rear spar 200. Said another way, a normal of the rear spar 200 (a line extending perpendicular to the rear spar 200) and a normal of the lower trunnion housing 616 (a line extending perpendicular to the lower trunnion housing 616) are parallel. A "normal" line of the rear spar 200 is labeled in FIG. 9. The normal line for the lower trunnion housing 616 is coincident with the central axis 621. As shown, these two lines are parallel (in both the vertical and horizontal dimension). Because of this orientation of the lower trunnion housing 616, the side load fitting 630 can be employed on either side (inboard or outboard) of the lower trunnion housing 616 and still provide an effective load path for transferring the load to the rear spar 200, as opposed to known assemblies having trunnion housings that are angled outboard and can only effectively support side load fittings on the outboard side. This enables the side load fitting 630 to be employed on the inboard side of the lower trunnion housing 616 so that the side load fitting 630 can share the side load backup fitting 804 (FIG. 8) with the upper stabilization brace fitting 644. Also, because the lower trunnion housing 616 is parallel to the rear spar 200, the first and second vertical support fittings 610, 612 can extend outward from (e.g., perpendicular to) the rear spar 200, rather than being angled relative to the rear spar 200 as in the known assembly 304 shown in FIGS. 3-5. This eliminates hidden fasteners that are typically difficult to install. This also enables for easier maintenance inspection. Further, the parallel orientation of the lower trunnion housing 616 enables use of the off-normal rotational capability of the bearing 618 more than known designs.

Figure 10A:
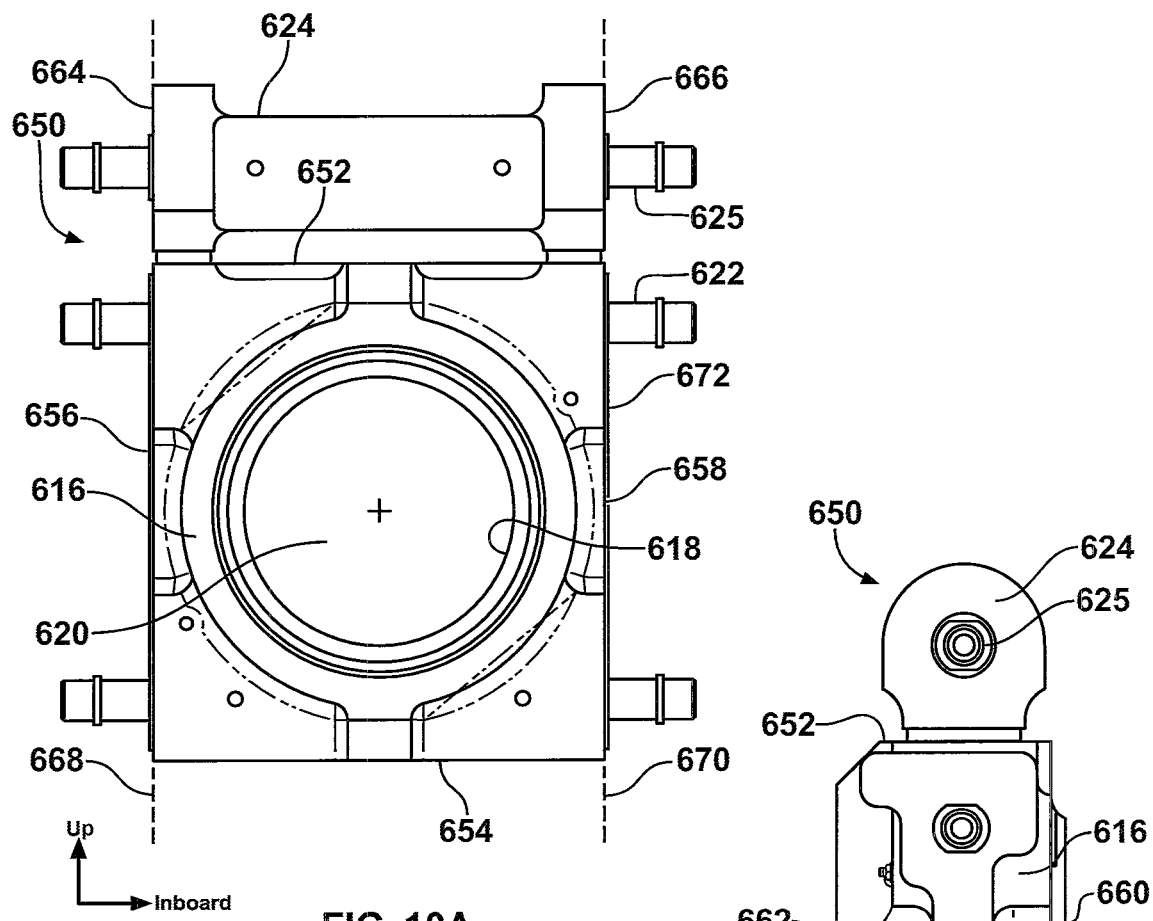
FIGS. 10A and 10B are elevation views of a known trunnion housing sub-assembly, including an upper housing and a lower trunnion housing.
Figure 10B:
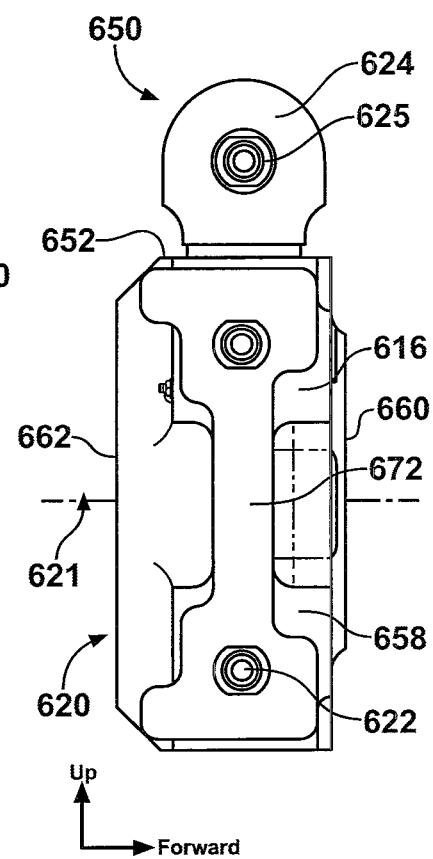
Figure 10C:
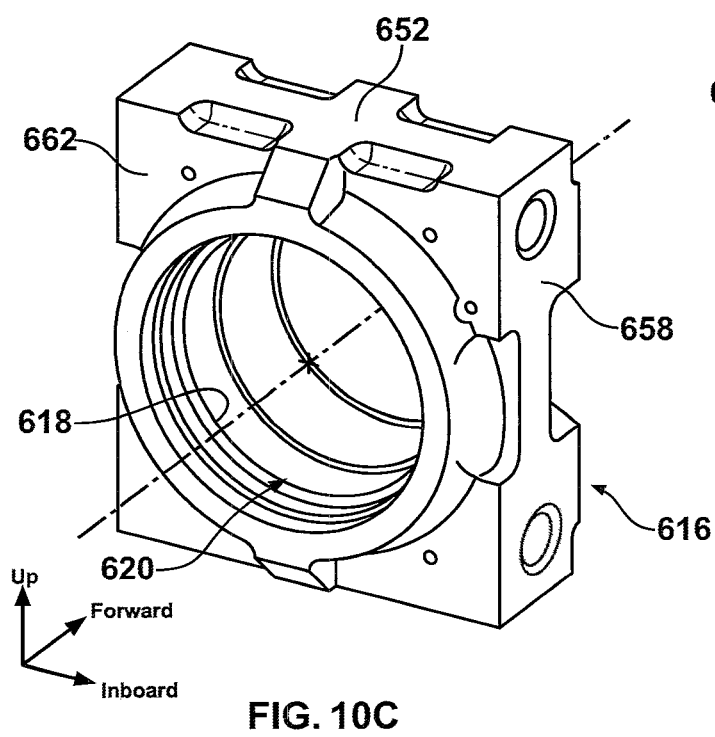
FIG. 10C is a perspective view of the lower trunnion housing of FIGS. 10 and 10B.

FIGS. 10A and 10B show elevation views of the lower trunnion housing 616 and upper housing 624 of the known forward trunnion support assembly 600 (along with fuse pins 622, 625 and bearing pads or plates 672), and FIG. 10C shows a perspective view of the lower trunnion housing 616 without the upper housing 624 (and without the fuse pins 622, 625 and bearing pads or plates 672). Together, the lower trunnion housing 616 and upper housing 624 define a known trunnion housing sub-assembly 650, which may also include the fuse pins 622, 625 and bearings pads or plates 672. As illustrated in the figures, the lower trunnion housing 616 may be generally shaped like a rectangular prism, having opposed top and bottom sides 652, 654, opposed outboard and inboard sides 656, 658, and opposed forward and rearward sides or faces 660, 662. An opening 620 may be formed through the forward and rearward faces 660, 662 defining a spherical bearing 618 therewithin.

Figure 14:
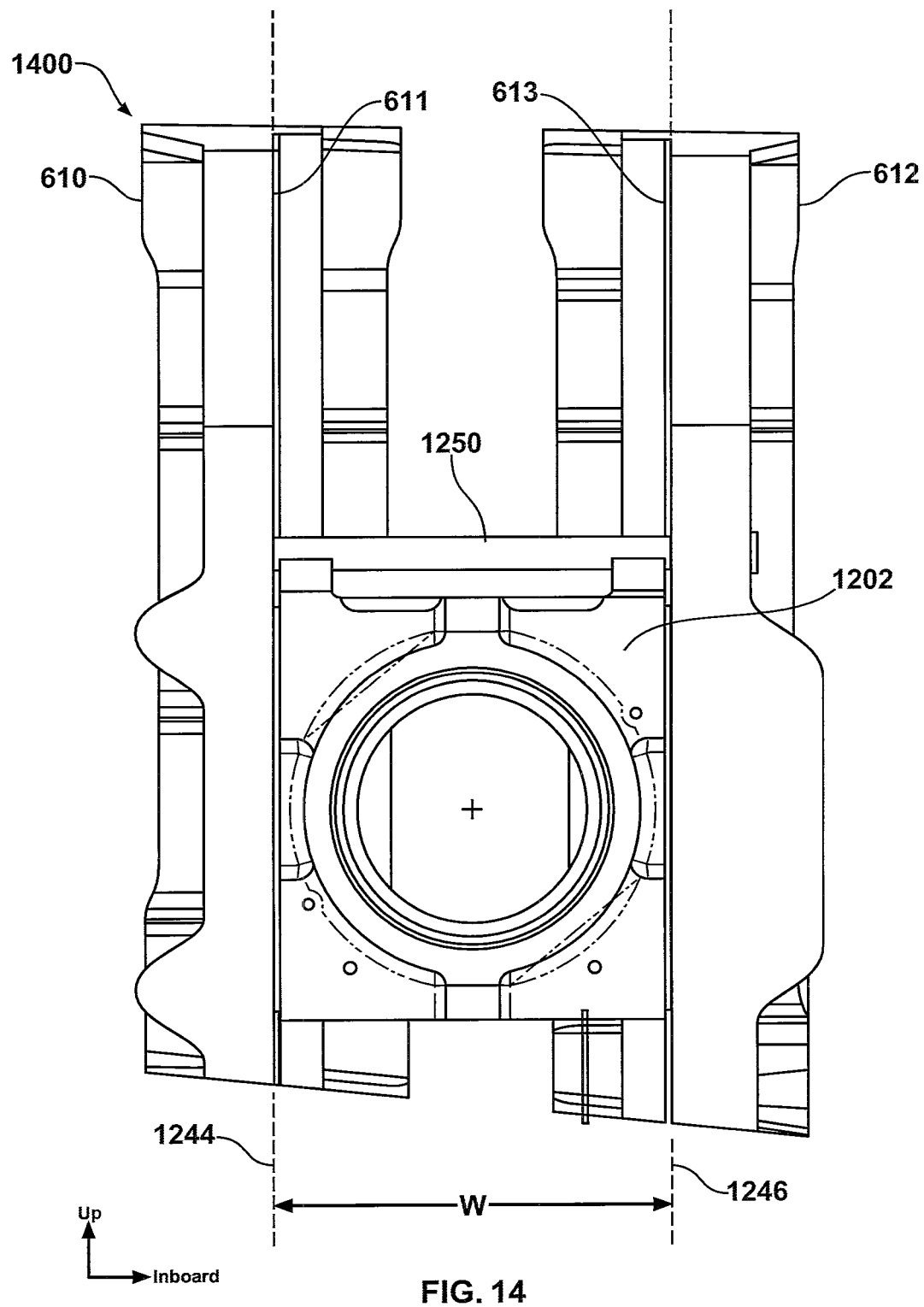
FIG. 14 is an elevation view of an example forward trunnion support assembly in accordance with the teachings of this disclosure.

The outboard and inboard sides 656, 658 of the lower trunnion housing 616 are generally flat, such that when the lower trunnion housing 616 is sandwiched between the first and second vertical support fittings 610, 612, the lower trunnion housing 616 is able to slide upward and downward along first and second interior vertical walls 611, 613 of the respective first and second vertical support fittings 610, 612. These first and second interior vertical walls 611, 613 are parallel with each other and define respective first (or outboard) and second (or inboard) mounting planes 668, 670, which are likewise parallel with each other, as may be seen in FIG. 14. Similarly, the upper housing 624 has a first (or outboard) side 664 and a second (or inboard) side 666 which are generally flat and parallel with each other. The lower trunnion housing 616, upper housing 624 and first and second vertical support fittings 610, 612 are dimensioned and configured such that when they are assembled as illustrated in FIG. 14—i.e., the first and second vertical support fittings 610, 612 are disposed with their respective first and second interior vertical walls 611, 613 parallel with each other, the lower trunnion housing 616 is disposed between and in slidable contact with the first and second interior vertical walls 611, 613, and the upper housing 624 is disposed atop the top side 652 of the lower trunnion housing 616, and with no fuse pins inserted—then the lower trunnion housing 616 and upper housing 624 may slide upward and downward along the first and second interior vertical walls 611, 613 (and likewise along the first/outboard and second/inboard mounting planes 664, 666).

Figure 11A:
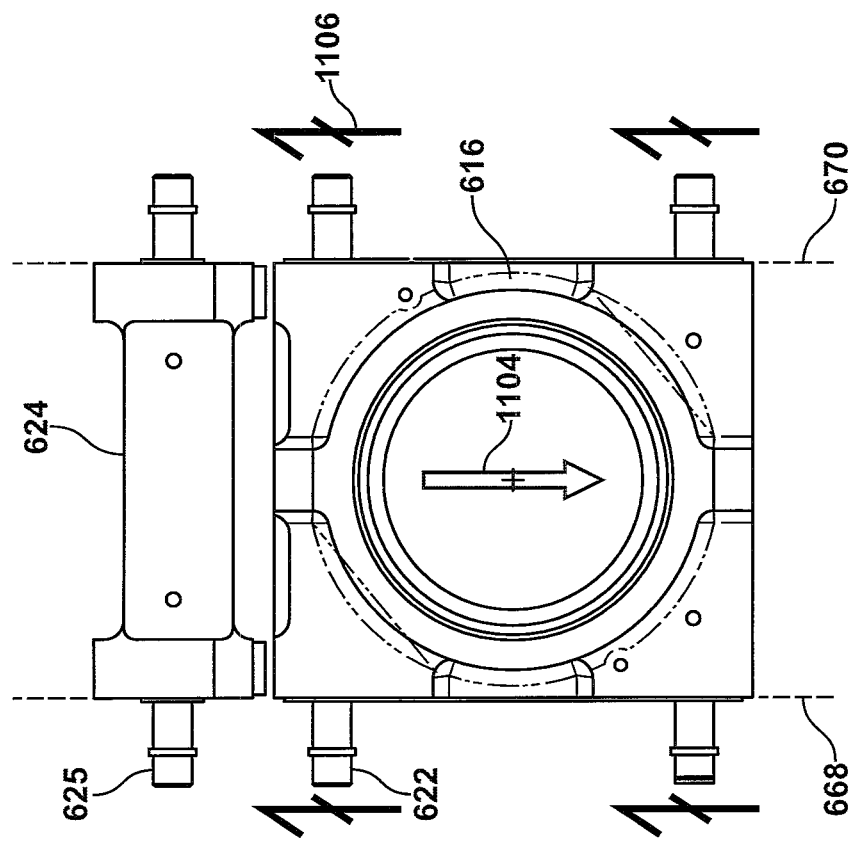
FIGS. 11A and 11B are elevation views of the known trunnion housing sub-assembly of FIGS. 10A and 10B, showing the reaction forces acting on the fuse pins in vertical overload and drag overload scenarios, respectively.
Figure 11B:
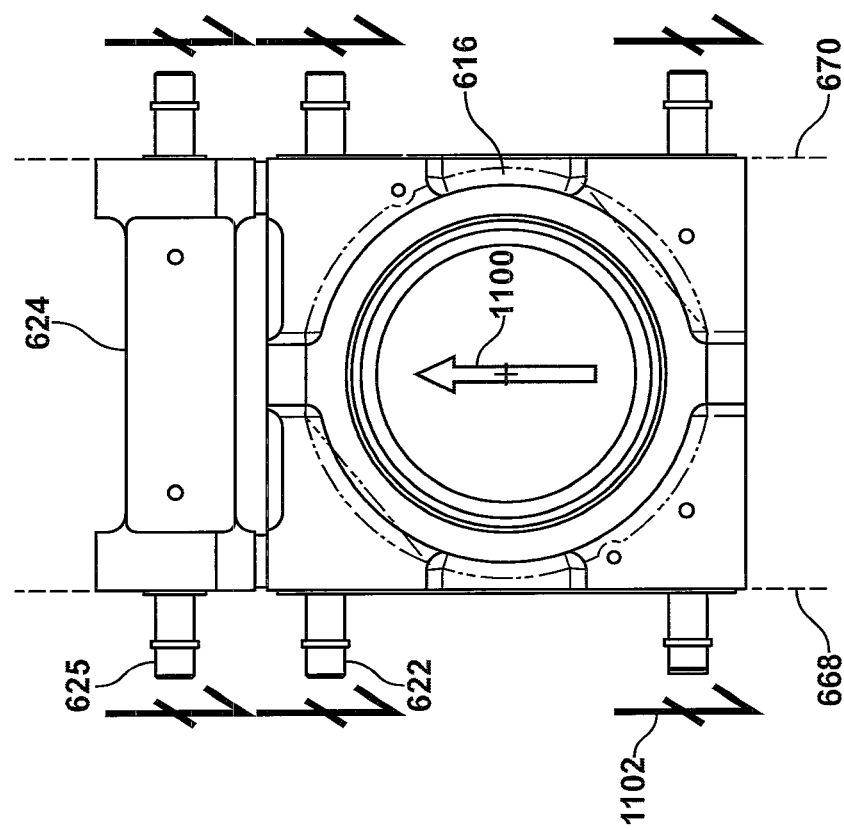

The purpose for the lower trunnion housing 616 and upper housing 624 being able to slide upward and downward as described is to facilitate the breakaway of the LMLG in the event of a vertical overload or a drag overload. This is illustrated in FIGS. 11A and 11B, which show the reaction forces acting on the fuse pins 622, 625 in vertical overload and drag overload scenarios, respectively. In FIG. 11A, upward arrow 1100 represents an upward force from the trunnion 300 resulting from a vertical overload (e.g., a hard landing). This upward force 1100 causes both the lower trunnion housing 616 and the upper housing 624 to "lift upward" with respect to the first and second vertical support fittings 610, 612, which in turn causes the first and second vertical support fittings 610, 612 to exert a downward reaction force 1102 against the fuse pins 622, 625. If this downward reaction force 1102 is large enough (i.e., if the upward force 1100 due to the vertical overload condition is large enough), then the fuse pins 622, 625 will be sheared through, causing the LMLG to break away from the wing 104. Similarly, in FIG. 11B, downward arrow 1104 represents a downward force from the trunnion 300 resulting from a drag overload (e.g., striking an object during takeoff or landing). This downward force 1140 causes the lower trunnion housing 616 (but not the upper housing 624) to "drop downward" with respect to the first and second vertical support fittings 610, 612, which in turn causes the first and second vertical support fittings 610, 612 to exert an upward reaction force 1106 against the fuse pins 622 (but not fuse pins 625). If this upward reaction force 1106 is large enough (i.e., if the downward force 1104 due to the drag overload condition is large enough), then the fuse pins 622 (but not fuse pins 625) will be sheared through, causing the LMLG to break away from the wing 104.

Note that while the vertical and drag overload conditions have been described in terms of how the lower trunnion housing 616, upper housing 624 and fuse pins 622, 625 of the known forward trunnion support assembly 600 would react, similar reactions would apply to the lower trunnion housing 408, upper housing 409 and fuse pins of the known forward trunnion support assembly 304.

While the known forward trunnion support assemblies 304, 600 of FIGS. 3-9 and the known trunnion housings and trunnion housing sub-assemblies 411, 650 of FIGS. 4-5 and 10-11 are effective, these known assemblies and sub-assemblies require the use of multiple components and fasteners. These components and fasteners add weight to aircraft 100, which reduces fuel efficiency. Further, the multiplicity of parts involved in the known forward trunnion support assemblies 304, 600 and trunnion housing sub-assemblies 411, 650 adds time to the assembly process. This reduction of fuel efficiency and increase of assembly time negatively impacts the cost-effectiveness of such known approaches.

Disclosed herein are example trunnion housings and example forward trunnion support assemblies that address the above drawbacks. FIGS. 12-13 show various views of an example trunnion housing 1202 and an example trunnion housing sub-assembly 1200, and FIGS. 14-17 show various views of an example forward trunnion support assembly 1400, constructed in accordance with the teachings of this disclosure. The example forward trunnion support assembly 1400 (which includes the example trunnion housing 1202 and example trunnion housing sub-assembly 1200) can be implemented on the first wing 104 of the aircraft 100 in place of the known assemblies 304, 600 shown in FIGS. 3-9.

FIGS. 12-13 show various elevation and perspective views of an example trunnion housing 1202 and an example trunnion housing sub-assembly 1200. The trunnion housing 1202 includes a generally rectangular prism-shaped body portion 1204 having opposed top and bottom sides 1212, 1214, opposed outboard and inboard sides 1216, 1218, and opposed forward and rearward sides or faces 1220, 1222. The body portion 1202 may be machined out of metal or otherwise fabricated, and has an opening 1206 through the forward and rearward sides 1220, 1222 defining a spherical bearing 1208 therewithin. The spherical bearing 1208 has a central axis 1210 perpendicular to the opposed forward and rearward sides 1220, 1222. First and second shoulders 1224, 1226 are formed on and protrude upward from the top side 1212 of the body portion 1204, with the first and second shoulders 1224, 1226 being spaced apart such that the first shoulder 1224 is disposed adjacent the outboard side 1216 and the second shoulder 1226 is disposed adjacent the inboard side 1218. Each of the first and second shoulders 1224, 1226 has a respective open trough or channel 1228, 1230 formed on a respective top surface 1232, 1234 thereof, thereby defining first and second cradles 1233, 1235. (That is, the first shoulder 1224 has a first open trough 1228 formed on a top surface 1232 of the shoulder 1224, thus defining a first cradle 1233 thereat; likewise, the second shoulder 1226 has a second open trough 1230 formed on a top surface 1234 of that shoulder 1226, thus defining a second cradle 1235 thereat.) The open troughs 1228, 1230 may be arcuately or semi-circularly profiled, and each of the open troughs 1228, 1230 has a respective longitudinal axis 1236, 1238 which is oriented perpendicular to the central axis 1210 of the bearing 1208.

The outboard and inboard sides 1216, 1218 of the trunnion housing 1202 may be generally flat and are configured for engagement with first and second vertical support fittings 610, 612, respectively (and with first and second mounting planes 1244, 1246, respectively, which are defined by the respective first and second interior vertical walls 611, 613). Each of the outboard and inboard sides 1216, 1218 of the trunnion housing 1202 includes a respective side portion 1240, 1242 of the first and second shoulders 1224, 1226.

The open troughs 1228, 1230 formed in the top surfaces 1232, 1234 are configured and dimensioned so as to fittably receive a single elongate fuse pin 1250 disposed across both open troughs 1228, 1230. (Therefore, the first and second cradles 1233, 1235 are likewise configured and dimensioned so as to fittably receive and support the single elongate fuse pin 1250 across both cradles 1233, 1235.) As may be seen in FIGS. 12-13, note that the first and second troughs or channels 1228, 1230 are described as being "open" because they are open and exposed (and thus not closed or covered) along their respective lengths, thus defining the cradles 1233, 1235, which are also open and exposed (and thus not covered) along their respective lengths (as viewed along the inboard-outboard direction). The trunnion housing 1202 and the single elongate fuse pin 1250 define the example trunnion housing sub-assembly 1200, which may also include the fuse pins 622 and bearing pads or plates 672.

FIG. 14 shows the example forward trunnion support assembly 1400, which includes the first and second vertical support fittings 610, 612, the trunnion housing 1202 and the single fuse pin 1250 (and optionally the fuse pins 622 and bearing pads or plates 672). The trunnion housing 1202 may be fitted between the first and second vertical support fittings 610, 612 with the single fuse pin 1250 extending across an entire width W between the first and second vertical support fittings 610, 612. The fuse pin 1250 has opposed first and second ends 1252, 1254, and one end of the fuse pin 1250 may be inserted through respective first and second holes 615, 617 formed in the first and second vertical support fittings 610, 612, such that the first end 1252 extends beyond the first hole 615 and the second end 1254 extends beyond the second hole 617.

Figure 15:
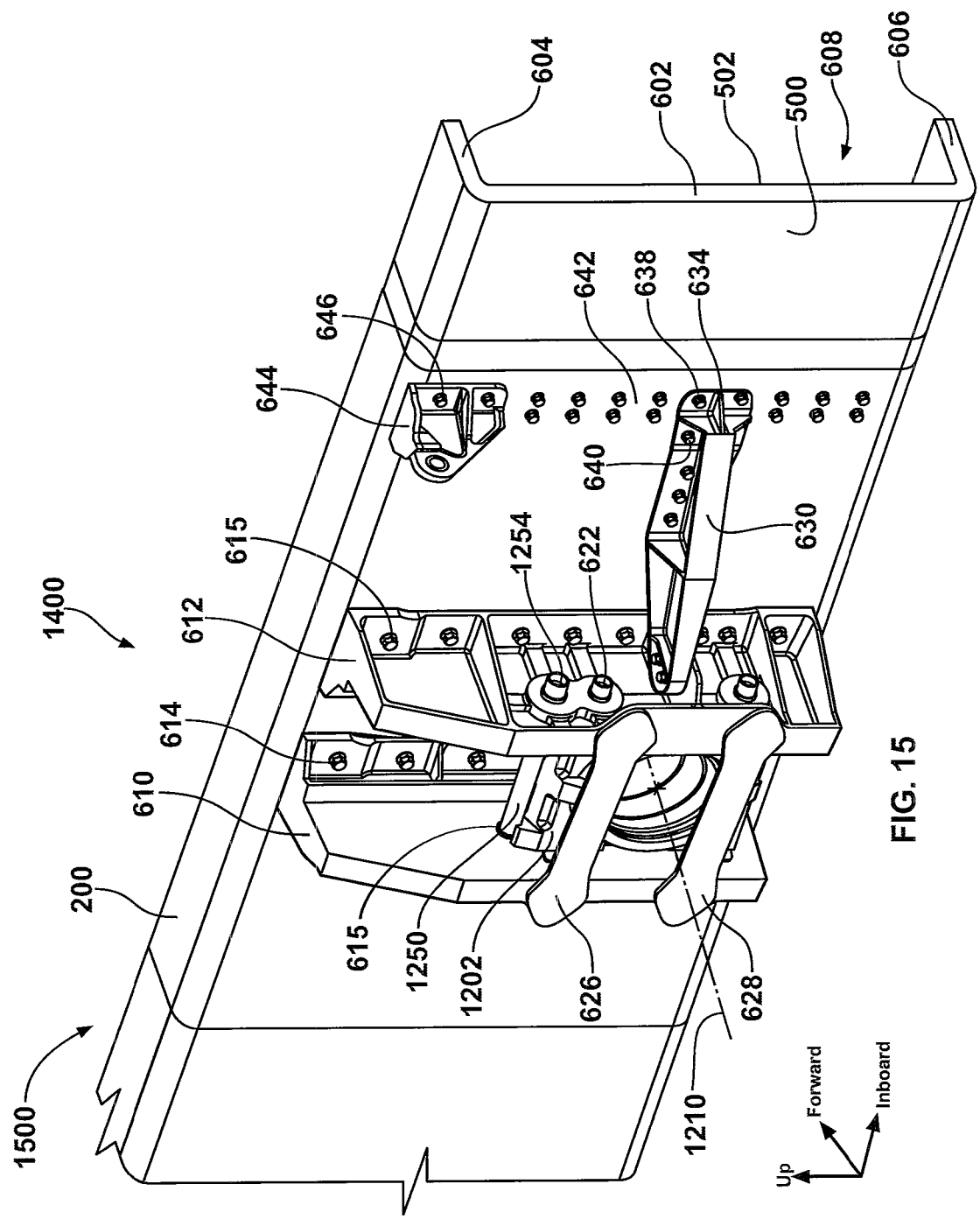
FIG. 15 is a perspective view of the example forward trunnion support assembly of FIG. 14 on the rear spar of the wing of the aircraft of FIG. 1.
Figure 16:
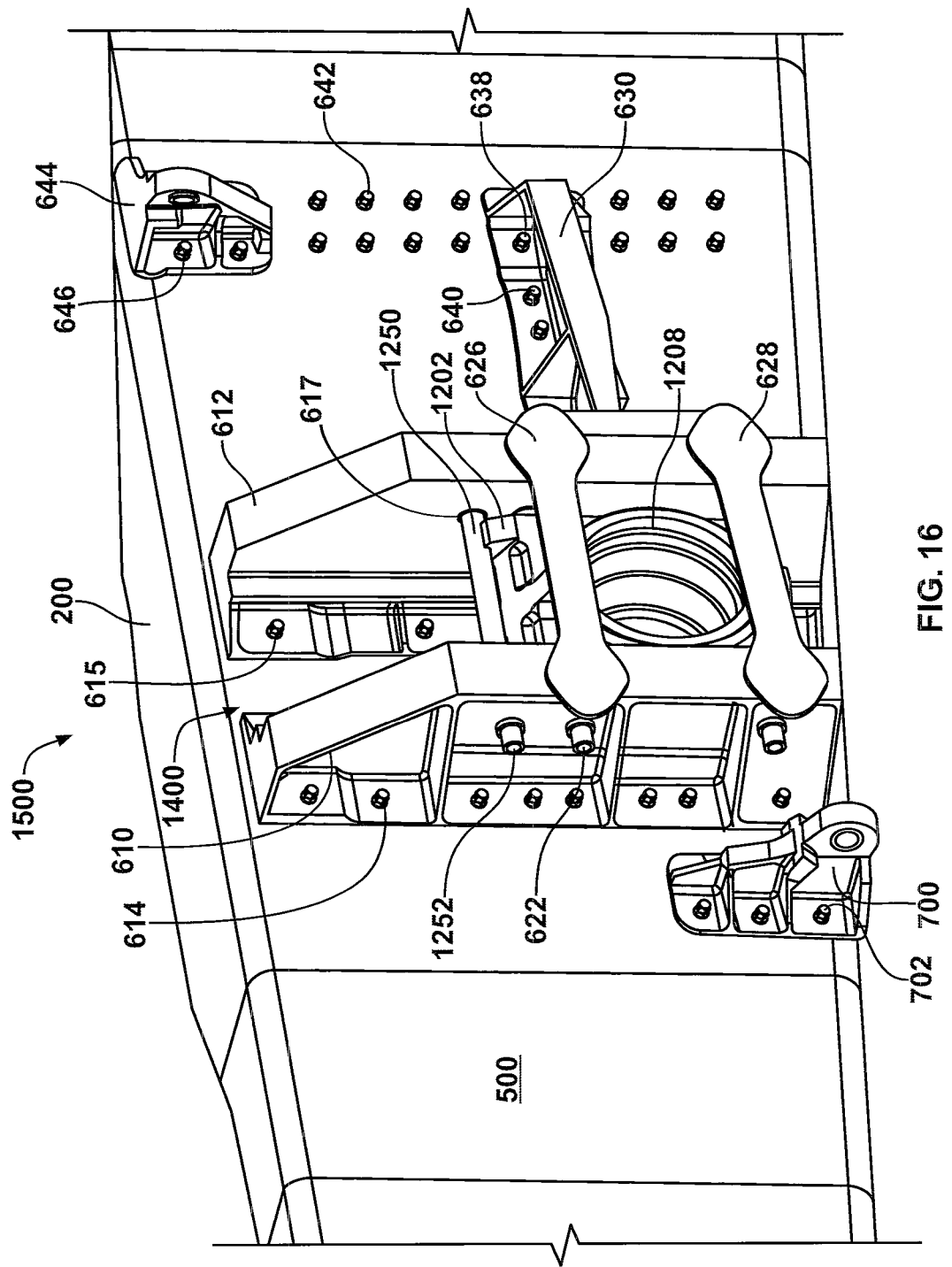
FIG. 16 is another perspective view of the example forward trunnion support assembly of FIG. 14 on the rear spar.
Figure 17:
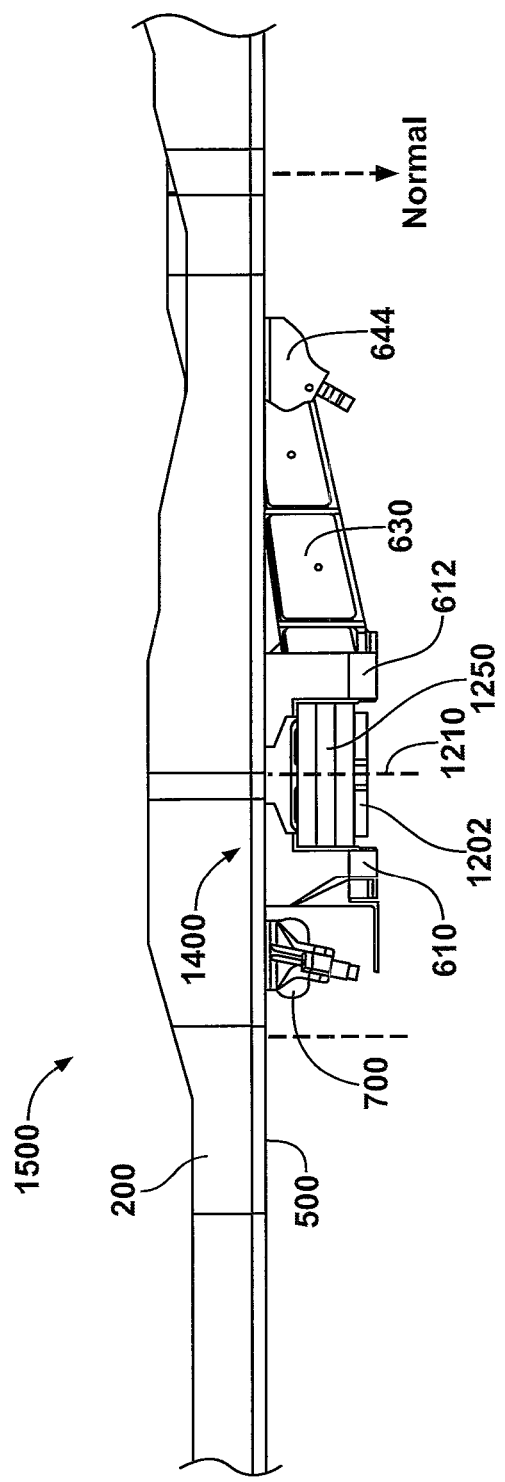
FIG. 17 is a top view of the rear spar of FIG. 15 showing the example forward trunnion support assembly.

FIGS. 15-17 show various views of the example forward trunnion support assembly 1400 as coupled to the rear spar 200 of the first wing 104 (FIG. 1). In the arrangement shown, an aircraft wing 1500 includes a rear spar 200 having a rear side 500 and a front side 502 opposite the rear side 500, and the example forward trunnion support assembly 1400. The example forward trunnion support assembly 1400 includes the first vertical support fitting 610 and the second vertical support fitting 612 coupled to the rear side 500 of the rear spar 200. The example forward trunnion support assembly 1400 also includes the trunnion housing 1202 having a bearing 1208, with the trunnion housing 1202 coupled between the first and second vertical support fittings 610, 612. As described earlier, the trunnion housing 1202 has first and second shoulders 1224, 1226 formed on the top side 1212 of the trunnion housing 1202, with each of the first and second shoulders 1224, 1226 having a respective open trough 1228, 1230 formed on a respective top surface 1232, 1234 thereof. The example forward trunnion support assembly 1400 further includes the single elongate fuse pin 1250 received within the open troughs 1228, 1230 and having the first end 1252 extending through the first vertical support fitting 610 (i.e., through the first hole 615) and the second end 1254 extending through the second vertical support fitting 612 (i.e., through the second hole 617).

Each of the open troughs 1228, 1230 may have an arcuate or semi-circular profile, and may be configured and dimensioned so as to fittably receive the fuse pin 1250 therewithin. The fuse pin 1250 may have a circular cross-section and may extend across an entire width W between the first and second vertical support fittings 610, 612, and each end 1252, 1254 of the fuse pin 1250 may include a head flange 1256 or a retainer nut 1258. The trunnion housing 1202 may have opposed first and second sides 1216, 1218 configured for engagement with the first and second vertical support fittings 610, 612, respectively, and wherein each of the first and second sides 1216, 1218 includes a respective side portion 1240, 1242 of the first and second shoulders 1224, 1226.

The bearing 1208 has a central axis perpendicular 1210 to the rear side 500 of the rear spar 200. Each of the open troughs 1228, 1230 formed on the respective top surfaces 1232, 1234 of the shoulders 1224, 1226 has a respective longitudinal axis 1236, 1238 oriented perpendicular to the central axis 1210 of the beating 1208. Further, the rear spar 200 may be constructed of carbon fiber or other composite material.

Many example fasteners are disclosed herein for connecting the various parts of the example forward trunnion support assembly 1400 such as the fasteners 614, 615, 636, 638, 640, 642, 646 and 702. These fasteners can be any size and/or type of fastener, including removable or reversible fasteners, such as bolts, screws, clamps, clips, etc. and/or non-reversible fasteners, such as rivets. Further, any of the example fasteners disclosed herein can be replaced by other fastening means, such as welding, adhesives, etc.

Figure 12A:
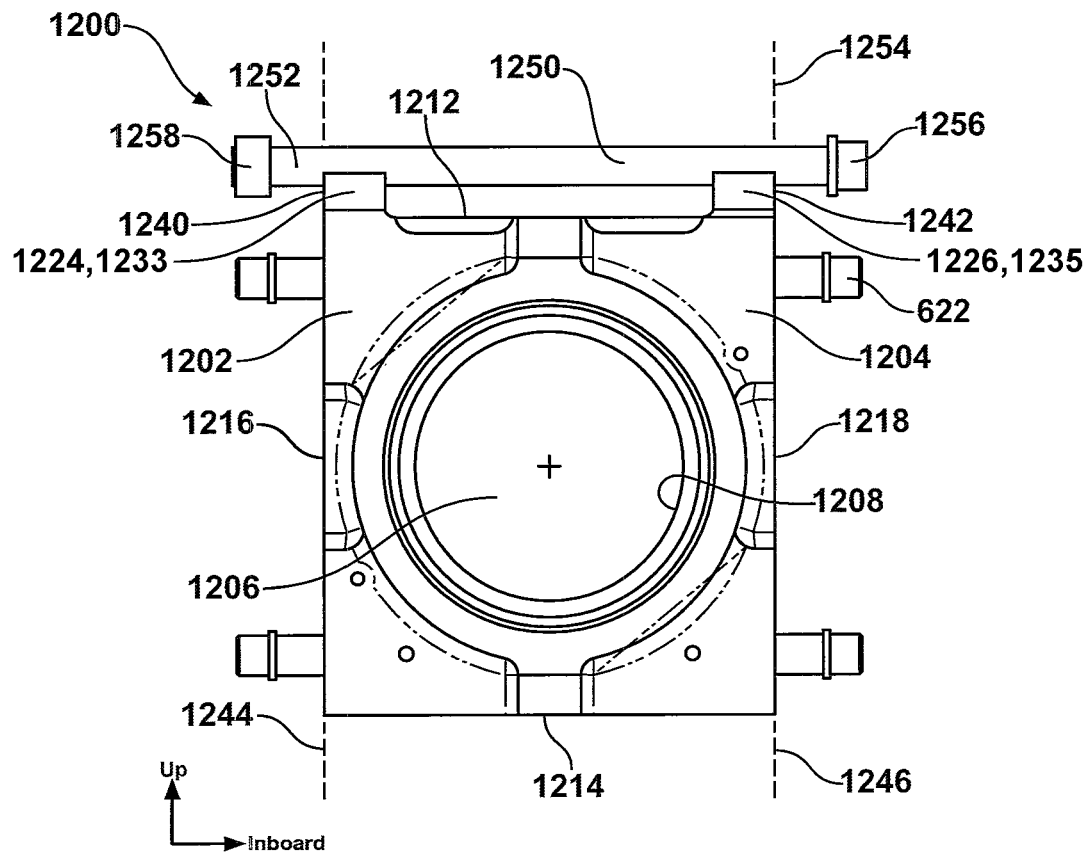
FIGS. 12A and 12B are elevation and perspective views, respectively, of an example trunnion housing in accordance with the teachings of this disclosure.
Figure 12B:
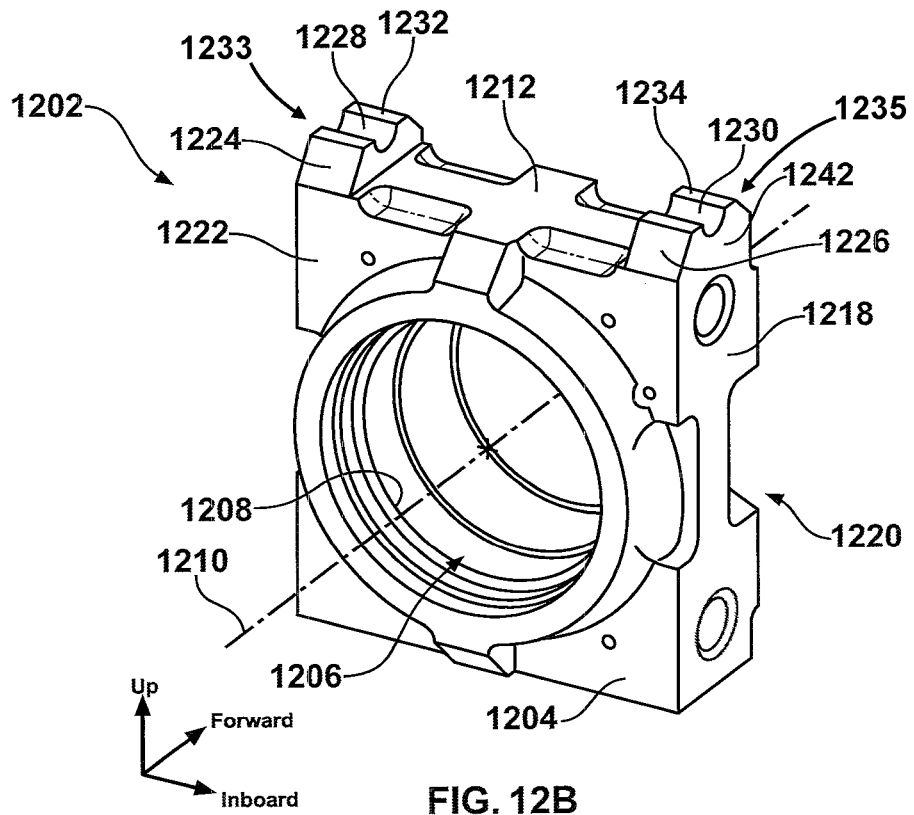
Figure 13A:
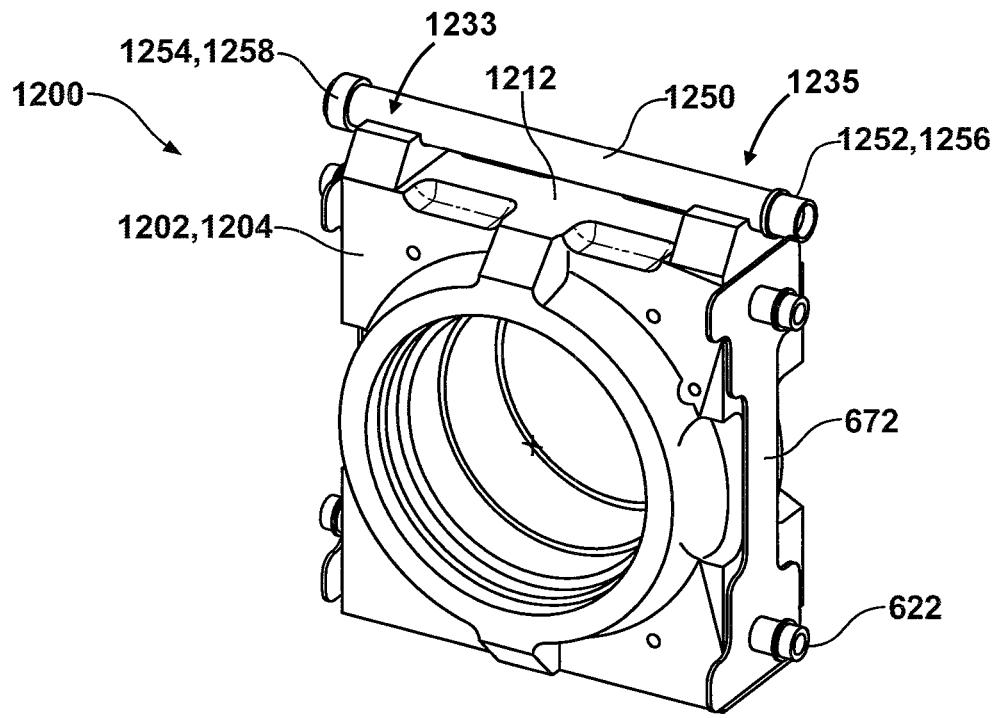
FIGS. 13A and 13B are perspective views of the example trunnion housing of FIGS. 12A and 12B with bearing pads or plates, showing the body portion with and without the single long fuse pin, respectively.
Figure 13B:
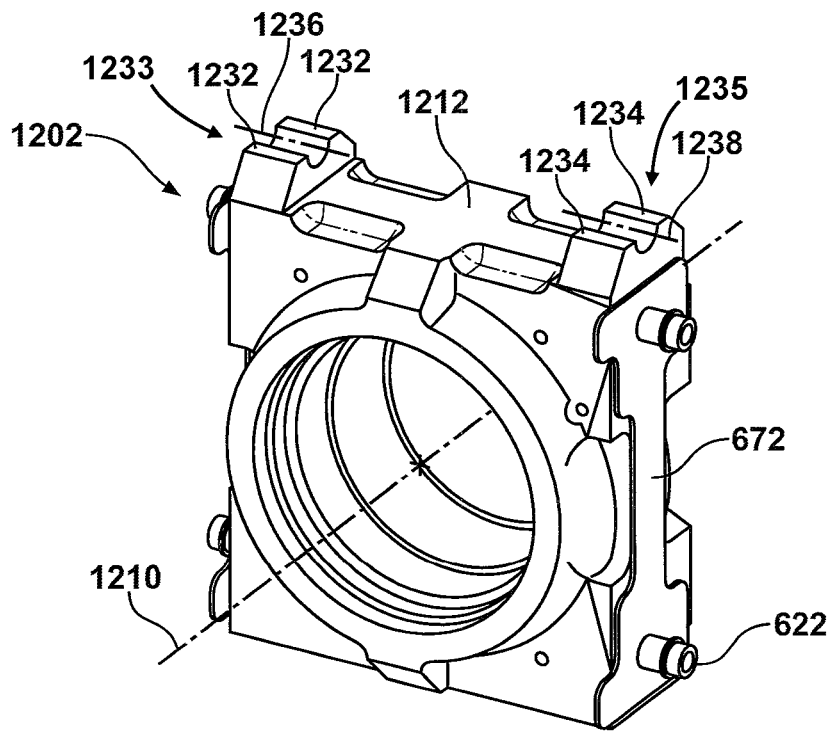

Comparing the known trunnion housing sub-assembly 650 (and lower trunnion housing 616) of FIGS. 10A and 10C to the example trunnion housing sub-assembly 1200 (and trunnion housing 1202) of FIGS. 12A and 12B, the advantages of the example approaches of the present disclosure over the known approaches may be seen. For example, whereas the known approaches use an upper housing 624 and two fuse pins 625, the example approach uses only a single fuse pin 1250 and no upper housing. This results in a significant reduction in weight as well as a reduction in the number of parts. The current approach provides the same functionality of utilizing fuse pins to facilitate separation of the LMLG in the event of vertical and drag overloads, but with the advantage of using only a single fuse pin 1250 rather than two fuse pins 625. Also note that whereas the upper housing 624 was used in the known approaches to shear off the fuse pins 625 in the event of a vertical overload, the example approach uses the shoulders 1224, 1226 which are integral with the trunnion housing 1202 to shear off a single fuse pin 1250 in two places (i.e., at the inboard and outboard mounting planes 1244, 1246).

Figure 18:
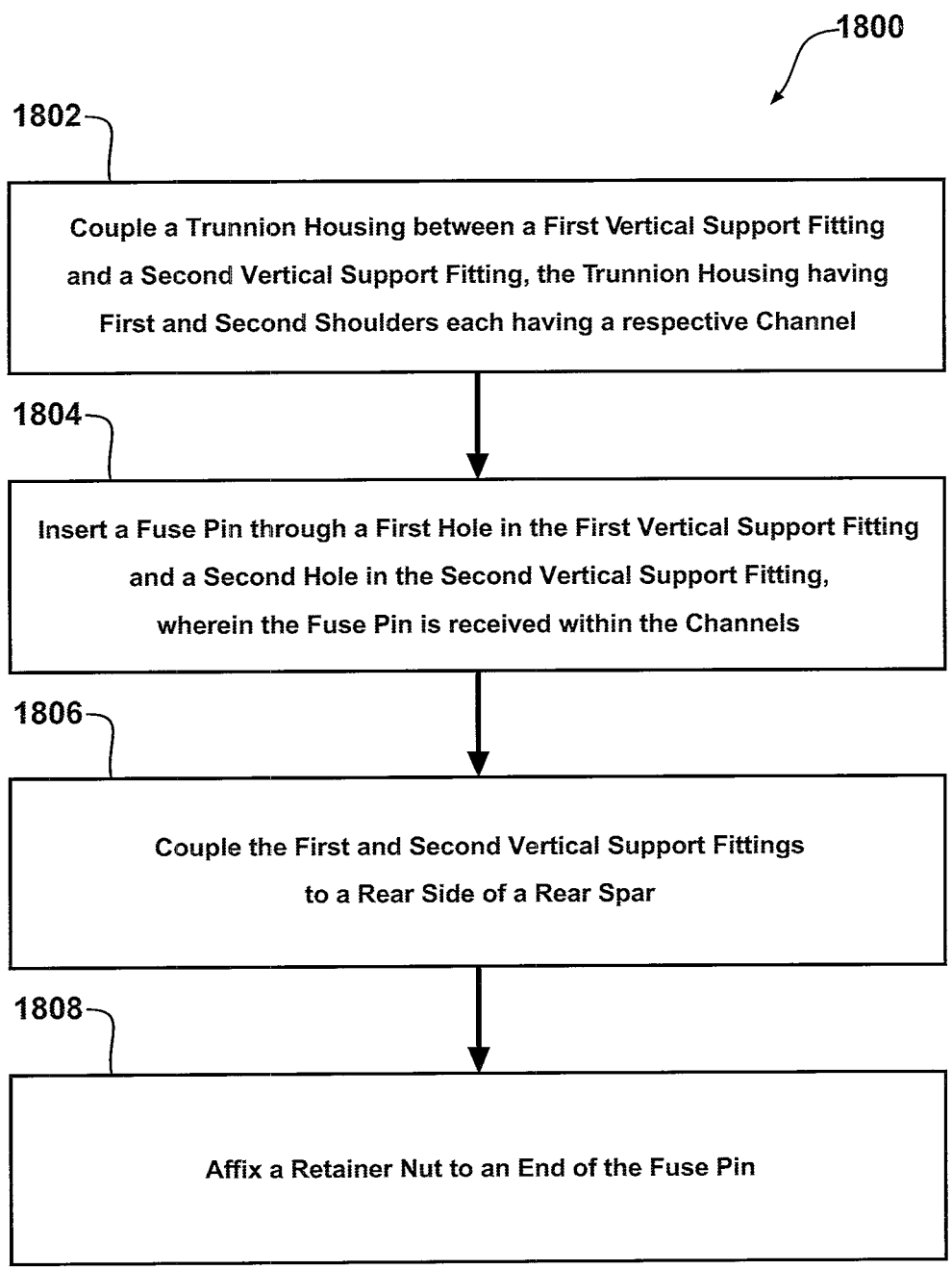
FIG. 18 is a flowchart representative of an example method of installing and/or assembling an example forward trunnion support assembly during a wing assembly process.

FIG. 18 is a flowchart representative of an example method 1800 of assembling and/or installing the example forward trunnion support assembly 1400 on the rear spar 200. The example method 1800 may be performed during assembly of the first wing 104 of the aircraft 100. In some examples, the wings of an aircraft are assembled first, and then the wings are coupled to the side of the fuselage. The elements of the example method 1800 may be rearranged, repeated, and/or omitted. The example method 1800 discloses the installation of parts/components on the rear spar 200. The rear spar 200 and the various parts and components may have pre-drilled openings for receiving fasteners. In other examples, one or more of the fastener openings may be drilled when installing the various parts and components on the rear spar 200.

At block 1802, the trunnion housing 1202 is coupled between the first and second vertical support fittings 610, 612 (e.g., via the fuse pins 622). The trunnion housing 1202 includes a bearing 1208 and has first and second shoulders 1224, 1226 formed on a top side 1212 of the trunnion housing 1202, each of the first and second shoulders 1224, 1226 having a respective open trough 1228, 1230 formed on a respective top surface 1232, 1234 thereof. In some examples, the first and second straps 626, 628 are also coupled to the first and second vertical support fittings 610, 612.

At block 1804, a fuse pin 1250 is inserted through a first hole 615 in the first vertical support fitting 610 and a second hole 617 in the second vertical support fitting 612, wherein a first end 1252 of the fuse pin 1250 extends through the first hole 615 and a second end 1254 of the fuse pin 1250 extends through the second hole 617. With the trunnion housing 1202 coupled with the first and second vertical support fittings 610, 612 and the fuse pin 1250 inserted as described, the fuse pin 1250 is received within the first and second open troughs 1228, 1230.

At block 1806, the first and second vertical support fittings 610, 612 are coupled to the rear side 500 of the rear spar 200 (e.g., via fasteners 614, 615).

At block 1808, a retainer nut 1258 is affixed to one or both ends 1252, 1254 of the fuse pin 1250. One of the first and second ends 1252, 1254 of the fuse pin 1250 may include a head flange 1256; in such as case, the retainer nut 1258 may be affixed to the other of the first and second ends 1252, 1254 of the fuse pin.

In the example method 1800, the first and second shoulders 1224, 1226 are spaced apart such that after coupling the trunnion housing 1202 between the first and second vertical support fittings 610, 612, the first shoulder 1224 is disposed adjacent the first vertical support fitting 610 and the second shoulder 1226 is disposed adjacent the second vertical support fitting 612. Further, the trunnion housing 1202 may be coupled to the first vertical support housing 610 by a first plurality of fuse pins 622 and to the second vertical support housing 612 by a second plurality of fuse pins 622.

The steps 1802, 1804, 1806, 1808 of the example method 1800 may be carried out in a variety of sequences and orders. For example, the fuse pin 1250 may be inserted through the first and second holes 615, 617 in the first and second vertical support fittings 610, 612 before the first and second vertical support fittings 610, 612 are coupled to the rear spar 200. Alternatively, the fuse pin 1250 may be inserted through the first and second holes 615, 617 after the first and second vertical support fittings 610, 612 are coupled to the rear spar 200.

Various other parts or components can be installed and assembled to construct the first wing 104. Then, the first wing 104 may be coupled to the side of the fuselage 102. The second wing 106 may be similarly assembled and coupled to the fuselage 102.

From the foregoing, it will be appreciated that example methods, apparatus, and articles of manufacture have been disclosed that provide lighter and less expensive forward trunnion support assemblies. By reducing weight of the aircraft, the example forward trunnion support assemblies improve fuel efficiency of the aircraft. The example forward trunnion support assemblies utilize fewer component than known assemblies and reduce footprint on the rear spar, which enables the example forward trunnion support assemblies to be implemented on smaller aircraft wings. The example forward trunnion support assemblies disclosed herein are also less expensive to manufacture and easier to install, which reduces time and labor costs associated with aircraft manufacture.

The following paragraphs provide various examples of the configurations disclosed herein.

Example 1 includes an aircraft wing, including a rear spar having a rear side and a front side opposite the rear side, and a forward trunnion support assembly. The forward trunnion support assembly includes a first vertical support fitting and a second vertical support fitting coupled to the rear side of the rear spar. The forward trunnion support assembly also includes a trunnion housing having a bearing, with the trunnion housing coupled between the first and second vertical support fitting. The trunnion housing has first and second shoulders formed on and protruding upward from a top side of the trunnion housing, with each of the first and second shoulders having a respective open trough formed on a respective top surface thereof. The forward trunnion support assembly further includes a fuse pin received within the open troughs and having a first end extending through the first vertical support fitting and a second end extending through the second vertical support fitting.

Example 2 includes the aircraft wing of Example 1, wherein the first and second shoulders are spaced apart such that the first shoulder is disposed adjacent the first vertical support fitting and the second shoulder is disposed adjacent the second vertical support fitting.

Example 3 includes the aircraft wing of Example 1, wherein each of the open troughs is configured to fittably receive the fuse pin.

Example 4 includes the aircraft wing of Example 1, wherein each of the open troughs has an arcuate profile.

Example 5 includes the aircraft wing of Example 1, further including one of a retainer nut and a head flange on each of the first and second ends of the fuse pin.

Example 6 includes the aircraft wing of Example 1, wherein the fuse pin is elongate and has a circular cross-section.

Example 7 includes the aircraft wing of Example 1, wherein the trunnion housing has opposed first and second sides configured for engagement with the first and second vertical support fittings, respectively. Each of the first and second sides includes a respective side portion of the first and second shoulders.

Example 8 includes the aircraft wing of Example 1, wherein the bearing has a central axis perpendicular to the rear side of the rear spar.

Example 9 includes the aircraft wing of Example 8, wherein each of the open troughs has a respective longitudinal axis perpendicular to the central axis of the bearing.

Example 10 includes the aircraft wing of Example 1, wherein the rear spar is constructed of carbon fiber.

Example 11 includes a method including coupling a trunnion housing between a first vertical support fitting and a second vertical support fitting. The trunnion housing includes a bearing and has first and second shoulders formed on and protruding upward from a top side of the trunnion housing, with each of the first and second shoulders having a respective open trough formed on a respective top surface thereof. The method further includes inserting a fuse pin through a first hole in the first vertical support fitting and a second hole in the second vertical support fitting. A first end of the fuse pin extends through the first hole and a second end of the fuse pin extends through the second hole, and the fuse pin is received within the open troughs.

Example 12 includes the method of Example 11, further including coupling the first and second vertical support fittings to a rear side of a rear spar of a wing of an aircraft.

Example 13 includes the method of Example 12, wherein the fuse pin is inserted through the first and second holes before the first and second vertical support fittings are coupled to the rear spar.

Example 14 includes the method of Example 12, wherein the fuse pin is inserted through the first and second holes after the first and second vertical support fittings are coupled to the rear spar.

Example 15 includes the method of Example 11, wherein one of the first and second ends of the fuse pin includes a head flange, and further includes affixing a retainer nut to the other of the first and second ends of the fuse pin.

Example 16 includes the method of Example 11, wherein the first and second shoulders are spaced apart such that after coupling the trunnion housing between the first and second vertical support fittings, the first shoulder is disposed adjacent the first vertical support fitting and the second shoulder is disposed adjacent the second vertical support fitting.

Example 17 includes the method of Example 11, wherein the trunnion housing is coupled to the first vertical support housing by a first plurality of fuse pins and to the second vertical support housing by a second plurality of fuse pins.

Example 18 includes a trunnion housing for an aircraft wing, including a generally rectangular prism-shaped body portion having opposed top and bottom sides, opposed outboard and inboard sides, and opposed forward and aftward sides. The body portion has an opening through the forward and aftward sides defining a spherical bearing therewithin, with the spherical bearing having a central axis perpendicular to the opposed forward and aftward sides. First and second shoulders are formed on the top side of the body portion. The first and second shoulders are spaced apart such that the first shoulder is disposed adjacent the outboard side and the second shoulder is disposed adjacent the inboard side. Each of the first and second shoulders has a respective arcuately profiled open trough formed on a respective top surface thereof, thereby defining first and second cradles, wherein each of the open troughs has a respective longitudinal axis perpendicular to the central axis of the bearing.

Example 19 includes the trunnion housing of Example 18, wherein the outboard and inboard sides are configured for engagement with first and second vertical support fittings, respectively. Each of the outboard and inboard sides includes a respective side portion of the first and second shoulders.

Example 20 includes the trunnion housing of Example 18 or 19, wherein the open troughs are configured to fittably receive a fuse pin disposed across both open troughs.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An aircraft wing, comprising:
   a rear spar having a rear side and a front side opposite the rear side; and
   a forward trunnion support assembly including:
   a first vertical support fitting and a second vertical support fitting coupled to the rear side of the rear spar;
   a trunnion housing having a bearing, the trunnion housing coupled between the first and second vertical support fittings and having first and second shoulders formed on and protruding upward from a top side of the trunnion housing, each of the first and second shoulders having a respective open trough formed on a respective top surface thereof, thereby defining first and second cradles; and
   a fuse pin received within the open troughs and having a first end extending through the first vertical support fitting and a second end extending through the second vertical support fitting.

2. The aircraft wing of claim 1, wherein the first and second shoulders are spaced apart such that the first shoulder is disposed adjacent the first vertical support fitting and the second shoulder is disposed adjacent the second vertical support fitting.

3. The aircraft wing of claim 1, wherein each of the open troughs is configured to fittably receive the fuse pin.

4. The aircraft wing of claim 1, wherein each of the open troughs has an arcuate profile.

5. The aircraft, wing of claim 1, further including one of a retainer nut and a head flange on each of the first and second ends of the fuse pin.

6. The aircraft wing of claim 1, wherein the fuse pin is elongate and has a circular cross-section.

7. The aircraft wing of claim 1, wherein the trunnion housing has opposed first and second sides configured for engagement with the first and second vertical support fittings, respectively, and wherein each of the first and second sides includes a respective side portion of the first and second shoulders.

8. The aircraft wing of claim 1, wherein the bearing has a central axis perpendicular to the rear side of the rear spar.

9. The aircraft wing of claim 8, wherein each of the open troughs has a respective longitudinal axis perpendicular to the central axis of the bearing.

10. The aircraft wing of claim 1, wherein the rear spar is constructed of carbon fiber.

11. A method, comprising:
    coupling a trunnion housing between a first vertical support fitting and a second vertical support fitting, the trunnion housing including a bearing and having first and second shoulders formed on and protruding upward from a top side of the trunnion housing, each of the first and second shoulders having a respective open trough formed on a respective top surface thereof, thereby defining first and second cradles; and
    inserting a fuse pin through a first hole in the first vertical support fitting and a second hole in the second vertical support fitting, wherein a first end of the fuse pin extends through the first hole and a second end of the fuse pin extends through the second hole, and wherein the fuse pin is received within the open troughs.

12. The method of claim 11, further comprising:
    coupling the first and second vertical support fittings to a rear side of a rear spar of a wing of an aircraft.

13. The method of claim 12, wherein the fuse pin is inserted through the first and second holes before the first and second vertical support fittings are coupled to the rear spar.

14. The method of claim 12, wherein the fuse pin is inserted through the first and second holes after the first and second vertical support fittings are coupled to the rear spar.

15. The method of claim 11, wherein one of the first and second ends of the fuse pin includes a head flange, and further comprising:
    affixing a retainer nut to the other of the first and second ends of the fuse pin.

16. The method of claim 11, wherein the first and second shoulders are spaced apart such that after coupling the trunnion housing between the first and second vertical support fittings, the first shoulder is disposed adjacent the first vertical support fitting and the second shoulder is disposed adjacent the second vertical support fitting.

17. The method of claim 11, wherein the trunnion housing is coupled to the first vertical support housing by a first plurality of fuse pins and to the second vertical support housing by a second plurality of fuse pins.

18. A trunnion housing for an aircraft wing, comprising:
a generally rectangular prism-shaped body portion having opposed top and bottom sides, opposed outboard and inboard sides, and opposed forward and aftward sides, the body portion having an opening through the forward and aftward sides defining a spherical bearing therewithin, the spherical bearing having a central axis perpendicular to the opposed forward and aftward sides; and
first and second shoulders formed on and protruding upward from the top side of the body portion, the first and second shoulders being spaced apart such that the first shoulder is disposed adjacent the outboard side and the second shoulder is disposed adjacent the inboard side, each of the first and second shoulders having a respective arcuately profiled open trough formed on a respective top surface thereof, thereby defining first and second cradles, wherein each of the open troughs has a respective longitudinal axis perpendicular to the central axis of the beating.

19. The trunnion housing of claim 18, wherein the outboard and inboard sides are configured for engagement with first and second vertical support fittings, respectively, and wherein each of the outboard and inboard sides includes a respective side portion of the first and second shoulders.

20. The trunnion housing of claim 18, wherein the open troughs are configured to fittably receive a fuse pin disposed across both open troughs.

* * * * *